United States Patent
Bhatt et al.

[19]

[11] Patent Number: 5,825,507
[45] Date of Patent: *Oct. 20, 1998

[54] ON-LINE MICROFILM STORAGE AND RETRIEVAL SYSTEM

[75] Inventors: Nikhil Bhatt, Alpharetta; Tuan Nguyen, Alanta; Lee Smith, Canton; David Tarbill, Cumming; Manfred Waldecker, Lawrenceville, all of Ga.

[73] Assignee: Inmet Systems, Inc., Atlanta, Ga.

[ * ] Notice: The term of this patent shall not extend beyond the expiration date of Pat. No. 5,367,382.

[21] Appl. No.: 561,800

[22] Filed: Nov. 22, 1995

[51] Int. Cl.$^6$ .................................................. H04N 1/00
[52] U.S. Cl. ........................ 358/403; 353/25; 353/26 A; 353/27 A
[58] Field of Search ................ 358/403; 353/25, 353/26 R, 26 A, 27 R, 27 A, 107, 108; 355/40

[56] References Cited

U.S. PATENT DOCUMENTS

| | | | |
|---|---|---|---|
| 4,353,642 | 10/1982 | Weigert | 355/45 |
| 4,420,232 | 12/1983 | Mischenko | 353/25 |
| 4,682,242 | 7/1987 | Sugita | 358/401 |
| 4,693,373 | 9/1987 | Lamb et al. | 209/3.3 |
| 4,720,849 | 1/1988 | Tayama | 358/401 |
| 4,732,467 | 3/1988 | Swenney | 353/25 |
| 4,746,209 | 5/1988 | Cirradi | 353/25 |
| 4,949,106 | 8/1990 | Igarashi | 353/25 |
| 5,104,215 | 4/1992 | Furukawa | 353/26 A |
| 5,113,268 | 5/1992 | Yoshida | 359/497 |
| 5,115,308 | 5/1992 | Onuki | 358/401 |
| 5,163,088 | 11/1992 | LoCascio | 358/403 |
| 5,170,266 | 12/1992 | Marsh et al. | 358/403 |
| 5,175,420 | 12/1992 | Bianco | 358/497 |
| 5,200,933 | 4/1993 | Wheeler et al. | 358/442 |
| 5,243,196 | 9/1993 | Yamada | 353/26 A |
| 5,367,382 | 11/1994 | Bhatt et al. | 358/403 |

OTHER PUBLICATIONS

Imnet's MegaSAR Brochure (1992).

Primary Examiner—Edward L. Coles, Sr.
Assistant Examiner—Madeleine Au Nguyen
Attorney, Agent, or Firm—Needle & Rosenberg, P.C.

[57] ABSTRACT

The microfilm storage and retrieval (MegaSAR-420) system of the present invention puts microfilm images on line in a document imaging system. A MegaSAR-420 could be connected to a PC LAN base document imaging system with specialized software. A remote user then has the ability to retrieve images of the stored microfilm. The MegaSAR-420 doubles the capacity of devices in the prior art, specifically including at least twenty-eight spoked hub units and using cartridges having greater storage capacity.

1 Claim, 19 Drawing Sheets

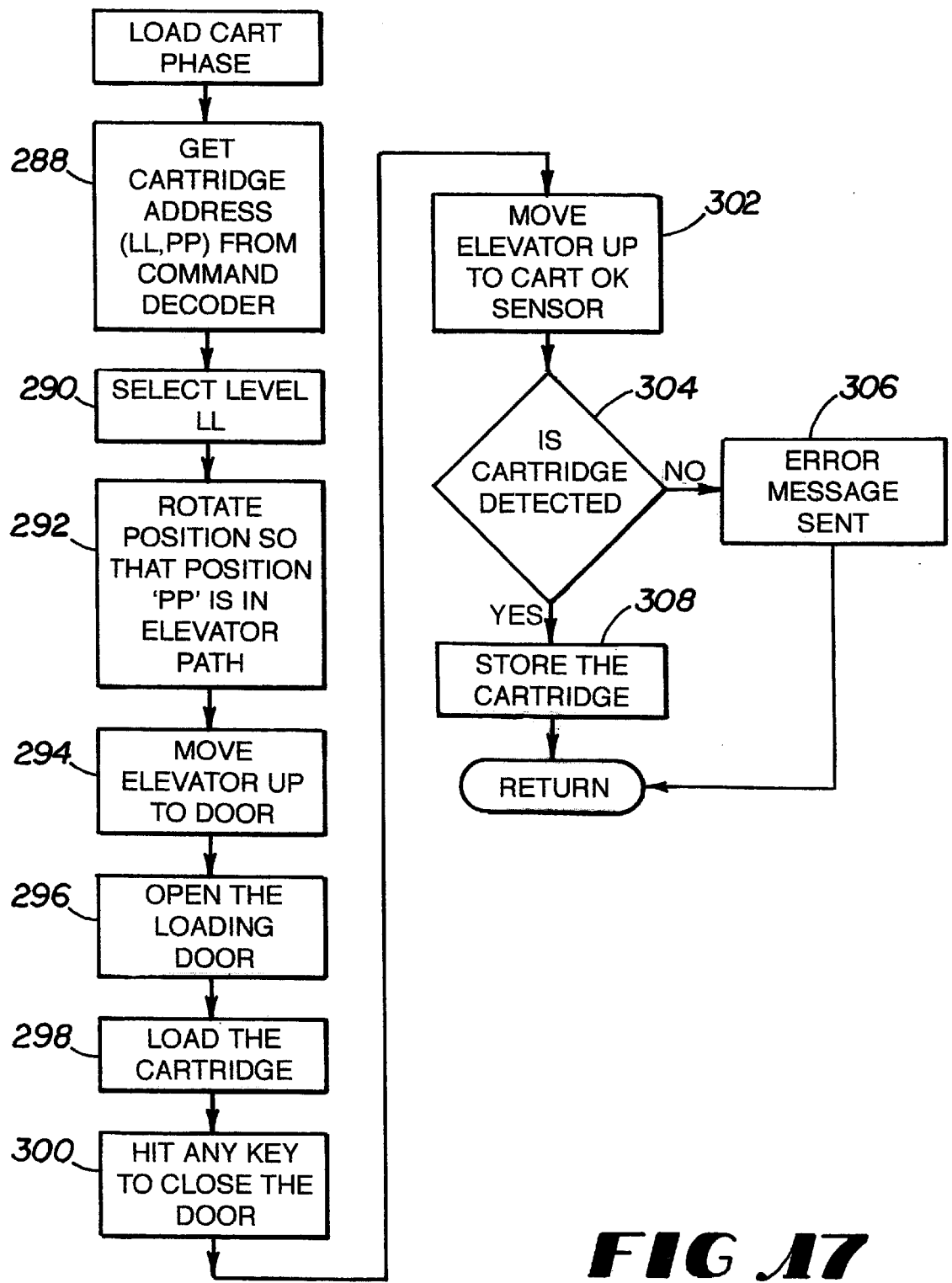
FIG A7

ON-LINE MICROFILM STORAGE AND RETRIEVAL SYSTEM

BACKGROUND OF THE INVENTION

Many microfilm storage and retrieval systems in the prior art use old analog technology and accordingly have a number of problems. Cartridge retrieval is done using theoretical values which do not work because of the mechanical variations and tolerances inherent within the alignment of the hardware elements used in the system. The prior art systems are only capable of fixed resolution and fixed window size image scanning. Very primitive fixed thresholding techniques are sometimes used to convert grey levels into binary data. The systems generally have no built-in intelligence for error recovery or self-diagnostics. The reliability of present systems is a main problem. The breakdown of such systems appears to be nearly an everyday affair. Most of the motors are driven using analog logic without any feedback and nearly always employ open loop controls. Primitive belt-driven motion control techniques are commonly used. No velocity profiles are generated or motions monitored. Using existing systems, no optimization is possible for the motion (based on distance to be moved). Inherently, compromised speeds must be picked for both short and long moves. Furthermore, the performance of existing systems appears very poor with limited band width.

Most existing systems accept only particular types of film (24X, 32X) with many restrictions. Image quality is generally governed by primitive thresholding techniques. Using the prior systems, it is not possible to extract information from the noisy data. There exists no provision for loading the cartridges using software without jeopardizing safety requirements.

The storage capacity of the present invention, known as the MegaSAR-420, is twice the storage capacity of the original MegaSAR. The retrieval unit taught in U.S. Pat. No. 5,367,382 which significantly advanced the art. The apparatus disclosed in that patent had completely re-engineered electronics. Digital technology was used throughout along with brand new algorithms and theory. State-of-the-art technology for that time was used, thus adding many capabilities. The present invention improves the apparatus disclosed in U.S. Pat. No. 5,367,382. Most notably, the storage capacity is doubled. Storage capacity is doubled by complete redesign of cassette and also film reel as well as adding eight more spoked hubs (spiders). This is achieved by adding eight spoked hubs, also known as spider assemblies. In conjunction, the cartridges used in the present invention also have an increased storage capacity. In addition, the latest hardware technologies are employed. Software is completely redone in "Windows."™ Many of the mechanical subsystems are improved to increase system reliability and function. The system architecture also allows for future expansion or additions. Hardware and software subsystem designs are modular. The system, in sum, is developed with state-of-the-art technology and has double the capacity of the largest known existing system, which is disclosed in U.S. Pat. No. 5,367,382.

SUMMARY OF THE INVENTION

The improved microfilm storage and retrieval system (MegaSAR-420) of the present invention puts 2.4 million microfilm images at 24× on-line in a document imaging system. The MegaSAR-420 could be connected to a PC LAN based document imaging system with specialized software. A remote user then has the ability to retrieve images of the stored microfilm. MegaSAR-420 doubles storage capacity of current MegaSAR by redesigning cassette and film reel as well as adding eight more spiders.

BRIEF DESCRIPTION OF DRAWINGS

FIG. 17 depicts the steps involved in the load cartridge phase of the present invention.

DETAILED DESCRIPTION OF THE PREFERRED EMBODIMENT

Figure 1:
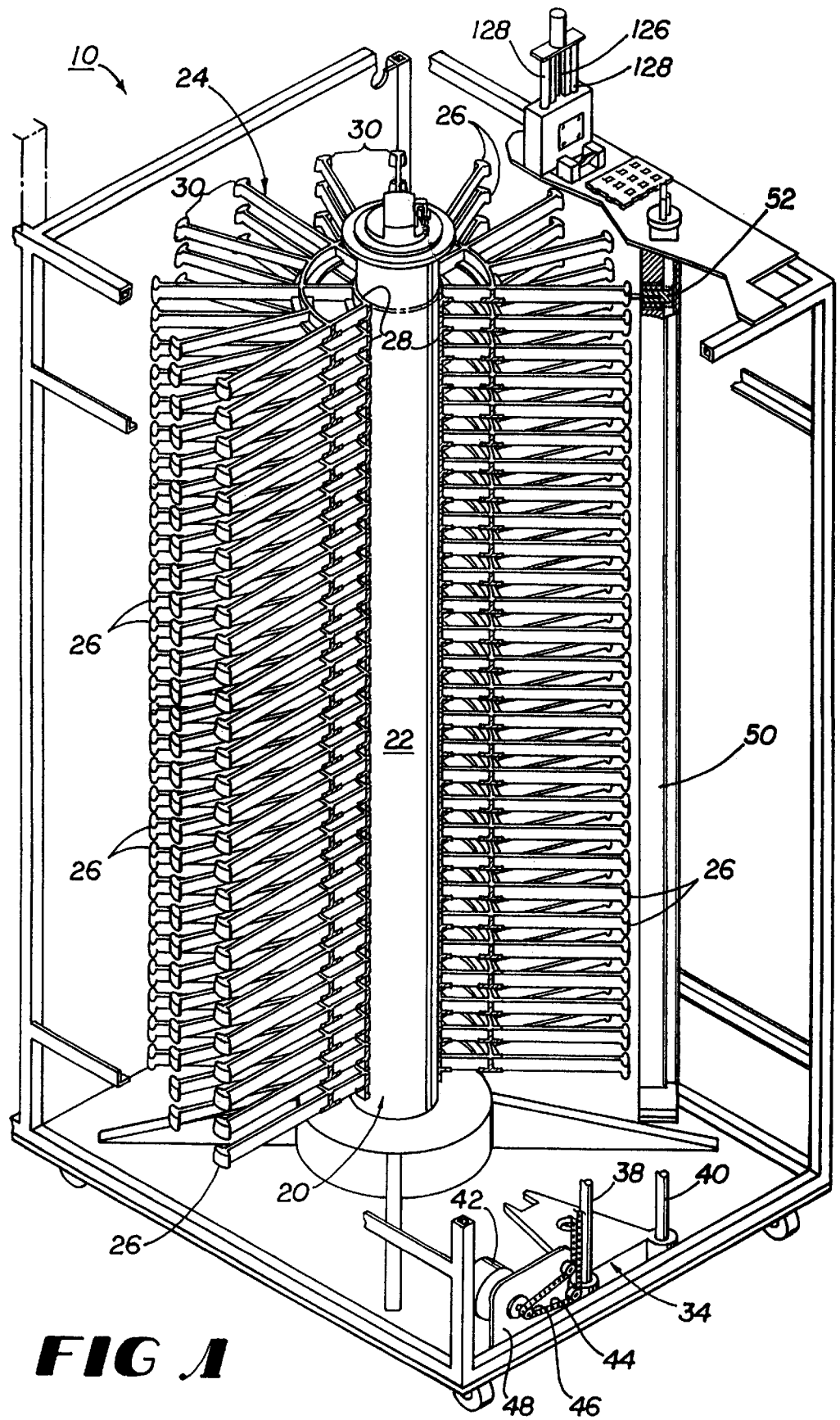
FIG. 1 is a perspective cut-away view of the storage and retrieval unit of the present invention.
Figure 2:
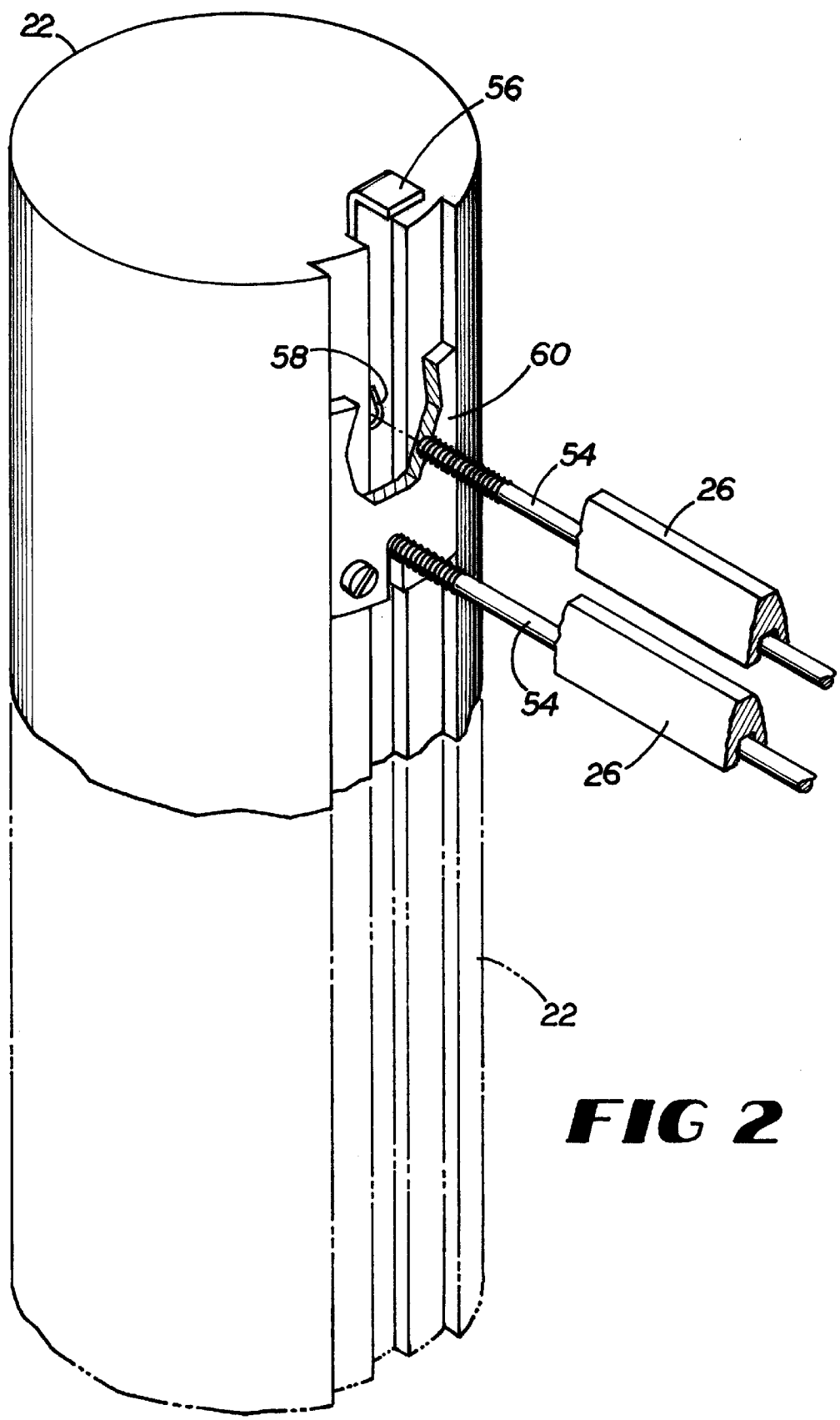
FIG. 2 illustrates the pick plate mechanism of the present invention.

The preferred embodiment of the improved on-line microfilm storage and retrieval system of the present invention, hereinafter referred to as MegaSAR-420, will be best understood in light of the detailed description below, in association with the accompanying drawings, wherein like reference numerals identify like elements.

From a functional standpoint, the preferred embodiment of the present invention includes three main subsystems which together constitute the storage and retrieval system. These three subsystems include 1) a cartridge handling subsystem, 2) a microfilm handling subsystem and 3) a video image processing subsystem. Each of these subsystems are discussed individually below to define the configuration and operation of the many components which operate together within each subsystem.

The first of the subsystems to be discussed is the cartridge handling subsystem. The MegaSAR-420 is approximately the size of a large washing machine. Most of the area occupied by the MegaSAR-420 system of the present invention is devoted to the accessible storage of various microfilm cartridges onto which image information has previously been stored. The objective of the cartridge handling subsystem is to respond to a request by selecting the desired microfilm cartridge, loading the selected cartridge into the film handling subsystem (discussed in detail below) and restoring the desired microfilm cartridge to that cartridge's assigned position within the unit.

The particular details for the cartridge handling subsystem of the present invention are precisely depicted in FIG. 1. The illustrated configuration is capable of holding up to 420 individual cartridges. The number of images that a particular cartridge MegaSAR-420 contains is a function of: the reduction ratio, the size of the original image compared to its size on the film, the number of images per blip, typically simplex or duplex, and the number of blips per roll of film. As used herein, the term blip refers to the markings or tags sometimes placed on each individual frame or a series of frames of the film contained within the film cartridge. The MegaSAR-420 preferably uses a redesigned cartridge in which the images stored on each cartridge varies from about 6000 images at 24× per cartridge (2.52 per MegaSAR-420) to about 20,000 images at 48× D40 per cartridge (8.4 million per MegaSAR-420).

The structural arrangement of the cartridge handling subsystem utilized by the MegaSAR system of the present invention revolves around a center column assembly 20. As illustrated in FIG. 1, the center column assembly 20 includes a center column 22 which is vertically positioned in the middle portion of the housing of the MegaSAR system. The center column 22 is connected to the shaft of a motor (not shown) which is located on the base of the MegaSAR housing. The motor is electrically controlled, so as to rotate the center column assembly in the appropriate direction an arc distance necessary to position the entire center column assembly 20 in the desired rotational orientation with regard to the housing of MegaSAR system 10. The direction and amount of rotation is determined by the processing unit of the MegaSAR system based upon the storage location of the particular cartridge.

Figure 3A:
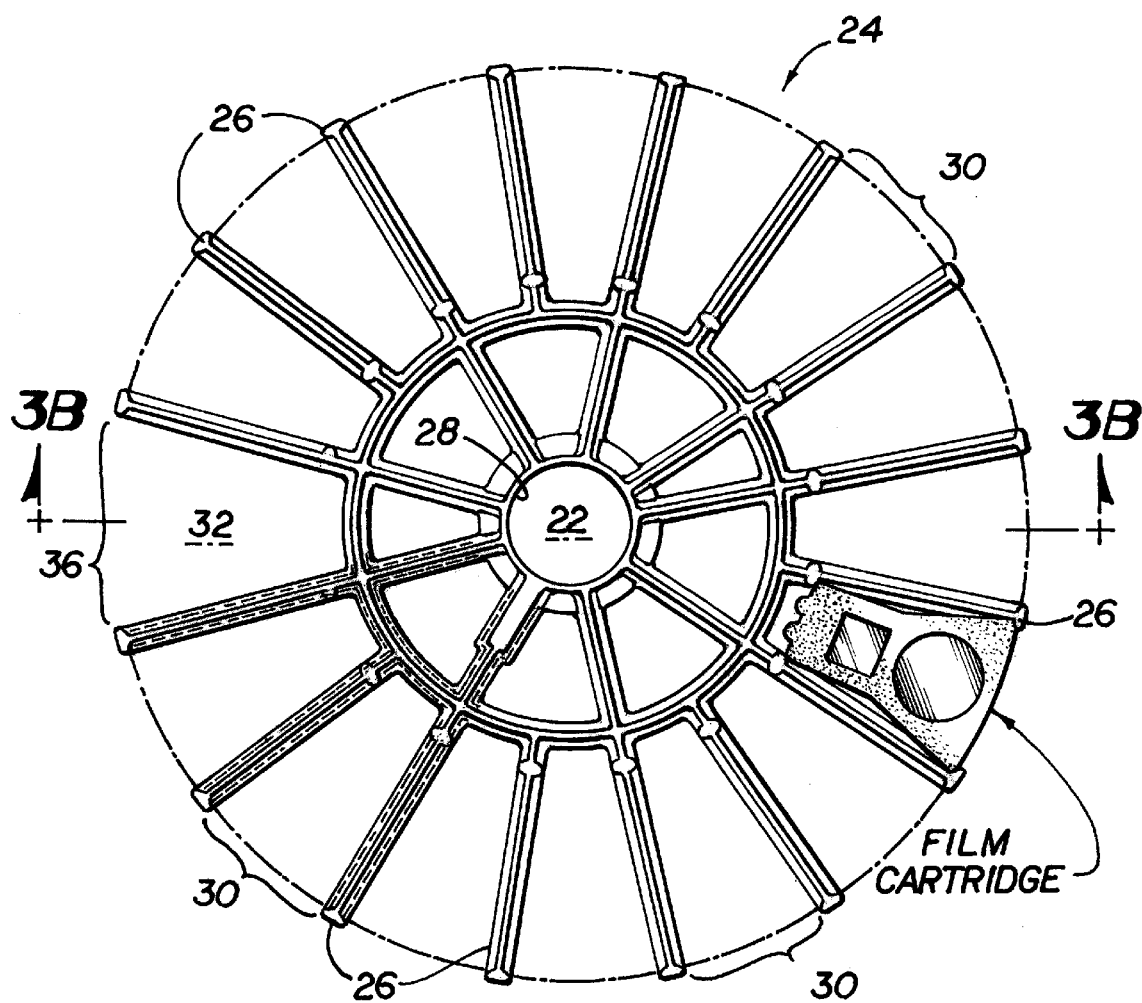
FIGS. 3A and 3B are a top view and a side view of the spider assembly of the present invention.
Figure 3B:
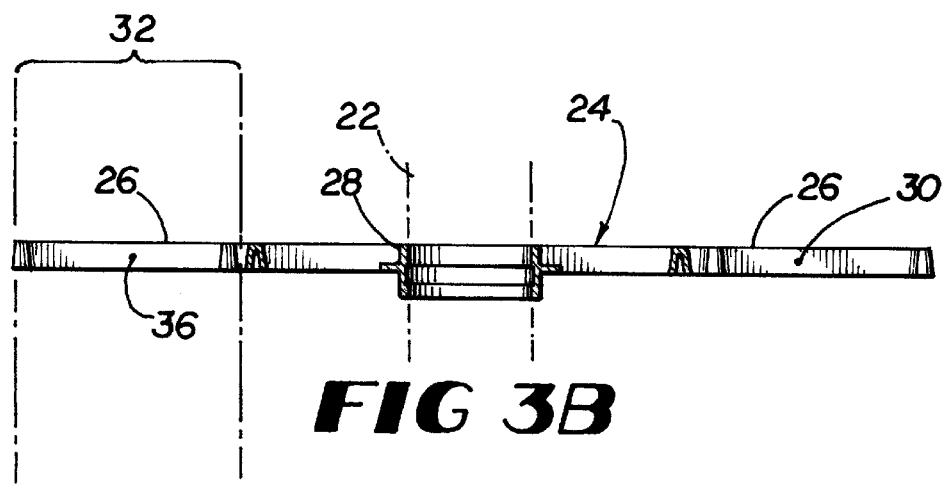

As depicted in FIG. 1, the center column assembly 20 further includes a plurality of spider assemblies (i.e., spoked hubs) 24 which each include a series of spider arms (i.e., spokes) 26 arranged to extend outward in a plane which is perpendicular to the axis of the center column 22. The plurality of spider assemblies 24 are not directly connected to the center column 22, but instead each of the spider assemblies 24 incorporates a center ring 28, as illustrated in FIG. 3, from which each of the spider arms 26 extend. The diameter of the center rings 28 is slightly larger than the center column 22. Therefore, each of the spider assemblies 24 are sequentially positioned so that each of the center rings 28 fits around the center column 22. This sequential positioning of the plurality of spider assemblies allows the spider assemblies 24 to be stacked along the height of the center column 22 with each of the spider arms 26 radiating horizontally from the vertical center column 22.

In the preferred embodiment, twenty-eight (28) spider assemblies 24 are stacked on top of each other, thereby establishing twenty-eight (28) rows of spider assemblies 24 capable of holding a series of microfilm cartridges. Each of the spider assemblies 24 are manufactured of lightweight aluminum or a similar material to allow efficient maneuvering of each assembly. Furthermore, a collection of hard metal spacers (not shown) are positioned between each of the rows of spider assemblies 24 to prevent the softer metal (aluminum) used to make the spider assemblies 24 from rubbing together when being rotated and thus possibly deforming one of the spider assemblies 24.

The individual spider arms 26 are uniformly separated, except for the elevator path which will be discussed in greater detail below, around the arc of the center column 22, such that each of the pair of spider arms 26 adjacent to one another form a cradle 30, as shown in FIG. 3. The dimensions of the cradle 30 are approximately equivalent to the dimensions of the microfilm cartridges being used in the MegaSAR system. The particular size and shape of the cartridge and the specific spacing and arrangement of the spider arms may be coordinated so that a variety of known cartridge shapes and sizes may be used in the system of the present invention. Furthermore, the film itself may be converted to the particular cartridge shape chosen. However, the specific construction of the spider rods 26 and the microfilm cartridges allows each cartridge to be supported by a corresponding cradle 30 whenever the cartridge is lowered into the cradle 30. The above stated design and construction allows any cartridge to be easily lifted out of its cradle 30 by applying an upward force from below the cartridge, but in the absence of such upward force gravity maintains the cartridge in its proper position in the cradle 30 created between each of the spider arms 26.

In the preferred embodiment of the present invention, the spider arms 26 are radially spaced so as to create fifteen (15) cradles 30, as depicted in FIG. 3, or positions for storing cartridges within each spider assembly 24. Therefore, given that there are twenty-eight (28) rows of spider assemblies with each of these twenty-eight (28) rows having fifteen (15) cradles for holding cartridges, the previously described architecture will allow the MegaSAR-420 system of the present invention to store and provide access from up to 420 microfilm cartridges.

Each of the spider assemblies 24 includes two spider arms 26 which are intentionally spaced far enough apart to allow the film cartridges to pass through vertically without being impeded. Therefore, since the microfilm cartridges can easily pass between these two spider arms 26, no cradle 30 is created between these two particular arms. The present invention utilizes this wide spacing 36 to designate a home position for each of the twenty-eight spider assemblies 24. Therefore, when each of the spider assemblies 24 are oriented in their home position, the wider gaps 36 or home positions of each spider assembly 24 are vertically aligned, thereby establishing a vertical column 32, the height of the center column 22 wherein microfilm cartridges can pass through the complete height of the stacked assemblies.

In the preferred embodiment of the present invention, the film handling subsystem is located at the top of the center column 22. To effectuate the maneuvering of the various cartridges from their designated row up to the top of the center column 22, the MegaSAR system of the present invention employs an elevator 34, which moves vertically, within this vertical column 32. The elevator 34 is horizontally oriented and shaped so as to be capable of freely moving between each of the cradles 30. The elevator 34 is moved vertically along two vertical shafts 38 and 40, shown in FIGS. 1 and 4, positioned near the periphery of the spider arm assemblies.

During the operation, the vertical movement of elevator 34 is coordinated with the rotational movement of the individual spider assemblies 24 such that the elevator 34 is positioned below the row occupied by the particular spider assembly 24 holding the cartridge determined to contain the image information requested by the operator. Before any rotational movement of the spider assemblies 24 or vertical movement of the elevator 34, the MegaSAR system of the present invention verifies that the particular cradle 30 which contains the cartridge storing the requested image information is in the only spider assembly 26 rotated out of its home position and that the elevator 34 is positioned in the vertical column 32 at a point lower than the spider holding the chosen cartridge. To obtain the desired cartridge, the spider then containing that cartridge is rotated such that the vertical column 32 is unobstructed except for the particular cradle 30 supporting the chosen cartridge.

To effectuate the vertical motion of the elevator 34 within vertical column 32, the present MegaSAR system utilizes an electric elevator motor 42, preferably secured to the base of the MegaSAR housing frame. The output shaft of the motor 42 is connected to a chain or belt 44 via a sprocket 46 to coordinate precisely the movement of the motor shaft to the movement of the chain or belt 44.

The chain or belt 44 is oriented around an upper pulley assembly (not shown), located at the top for the cartridge handling subsystem near the upper end of vertical shafts 38 and 40, and a lower pulley assembly 48, as illustrated in FIG. 1, preferably located near the output shaft of electric motor 42 and the lower end vertical shafts 38 and 40. The upper and lower pulley assemblies are positioned such that the chain or belt 44 is vertically oriented adjacent to the vertical shafts 38 and 40 along the entire height of the cartridge handling subsystem. By securely attaching the elevator 34 to one point along the chain or belt 44, the particular arrangement of the pulley assemblies, belt 44 and elevator motor 42 effectively transfers the rotational motion of the output shaft of elevator motor 42 into the vertical movement of elevator 34 within vertical column 32. The direction in which the elevator motor 42 is rotated controls whether the elevator 34 moves upward or downward.

In order to accurately control the rotational movement of each spider assembly 24 and ensure that only one spider assembly is rotated out of its home position at a time, the present MegaSAR system incorporates a suppression tree assembly 50. The suppression tree assembly 50 operates in coordination with the center column assembly 20 to selectively lock and unlock particular spider assemblies 26 to the rotatable center column 22. The control aspects of the locking and unlocking procedure will be discussed in greater detail below.

Figure 6:
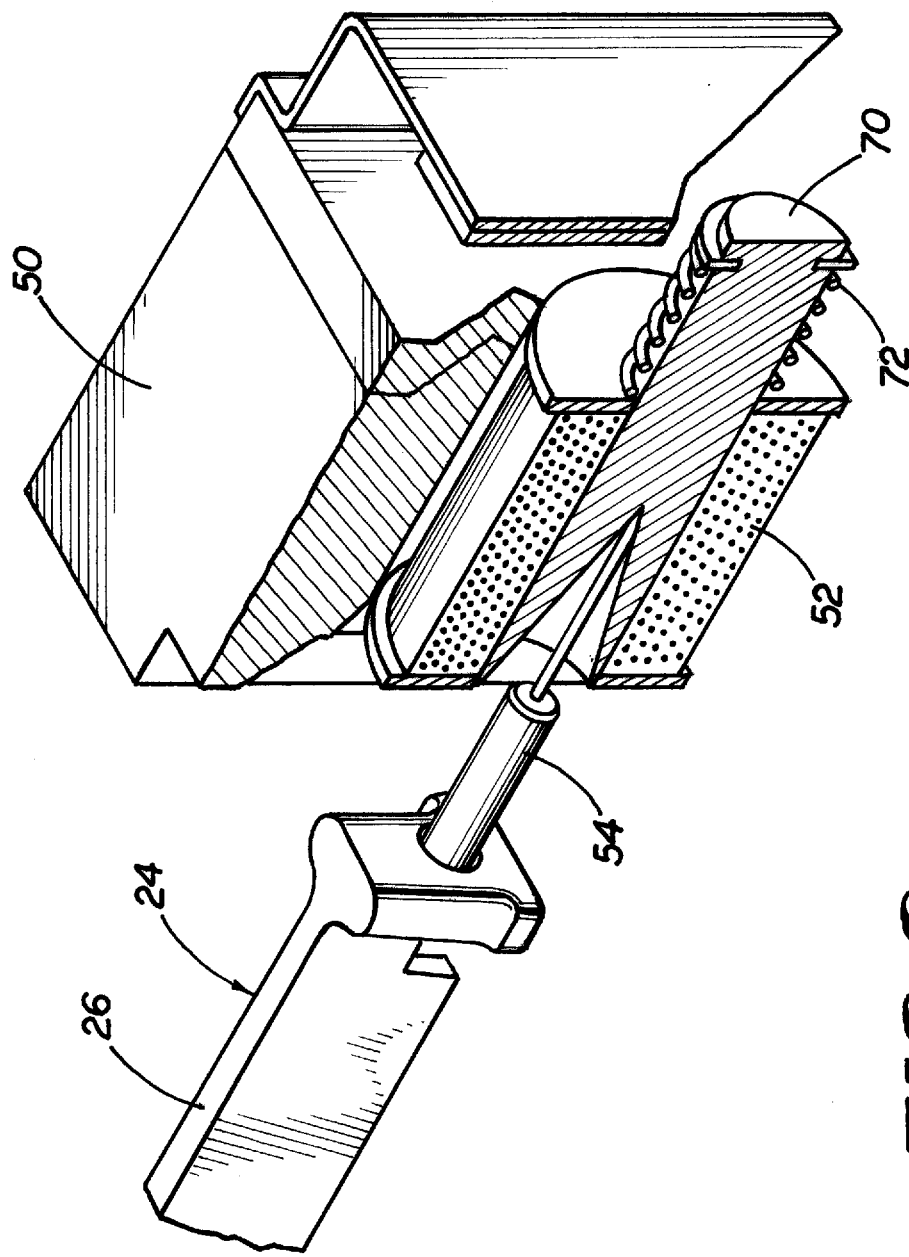
FIG. 6 is a cut-away view of the suppression tree locking mechanism of the present invention.

From the standpoint of mechanical structure, the suppression tree assembly 50 incorporates a series of vertically stacked solenoids 52 which are electrically connected to and controlled by the microprocessor unit which will be discussed in greater detail below. The number of solenoids 52 corresponds directly to the number of spider assemblies 24, with a solenoid 52 being physically oriented at the outer end of each spider assembly 24. A detailed cut-away view of one solenoid 52 within the suppression tree assembly 50 in relation to the spider arm 26 of the corresponding spider assembly 24 is shown in FIG. 6.

Figure 7:
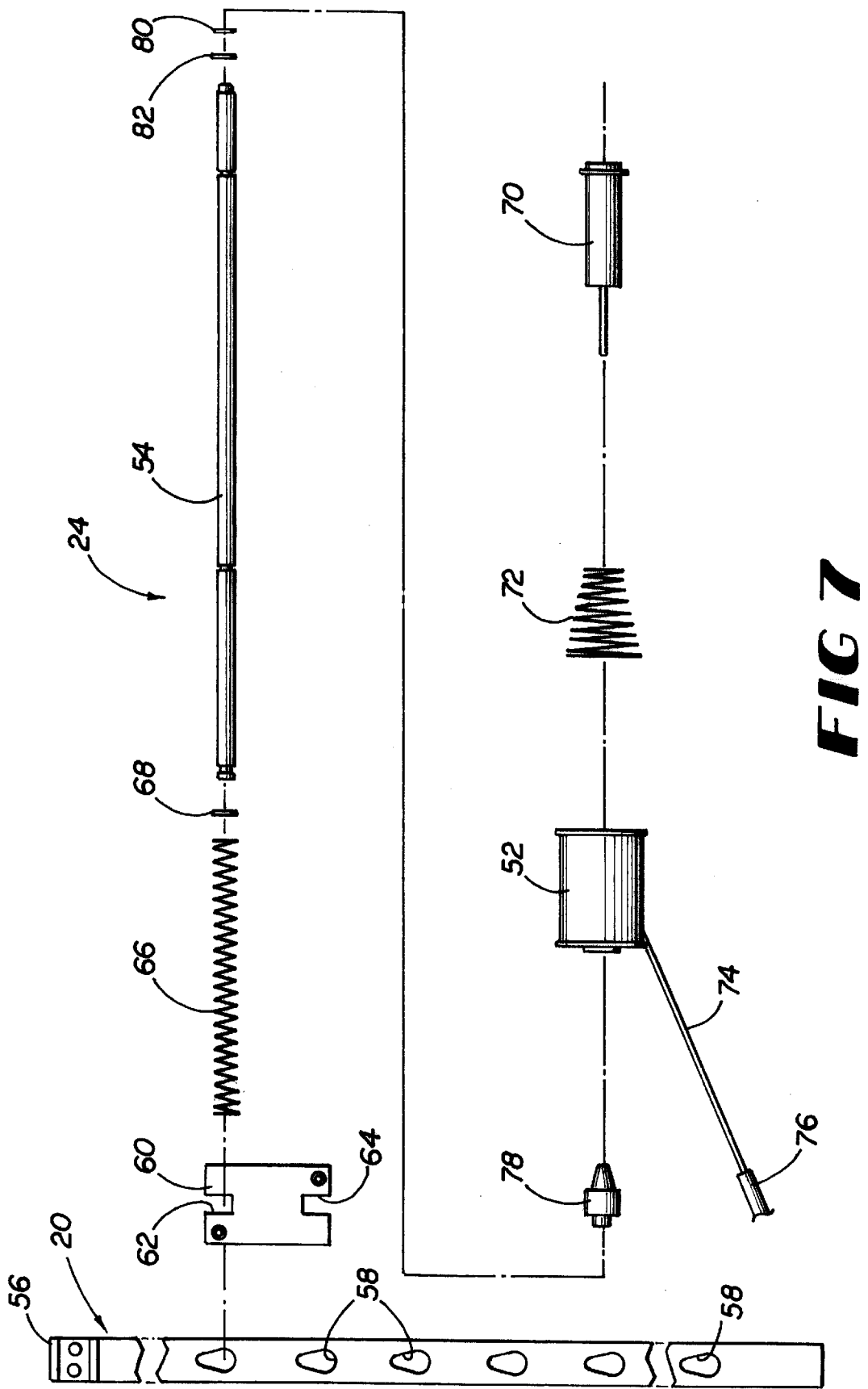
FIG. 7 is an exploded view of the component of the spider arm/column locking mechanism of the present invention.

The particular mechanical mechanism utilized in the preferred embodiment of the present invention to lock and unlock the suppression tree assembly 50 to the center column 22 is illustrated in an expanded arrangement in FIG. 7. As illustrated in FIG. 7, various mechanical elements are incorporated to lock or unlock the selected spider assembly 24. The main component utilized to actually lock and unlock the suppression tree assembly 50 to the center column assembly 20 is a locking rod 54. The locking rod 54 is a cylindrical rod with a relatively small diameter with specific machining at both ends and approximately the length of the spider arms 26. The present MegaSAR system includes one locking rod 54 for each spider rod assembly 24, wherein each of the locking rods 54 are horizontally oriented and positioned directly underneath their corresponding spider arm 26. The remaining mechanical elements, which will be discussed in greater detail below, act in conjunction with their corresponding locking rod 54 to move or hold that locking rod 54 in its proper position for that stage in the cartridge handling process.

Figure 8:
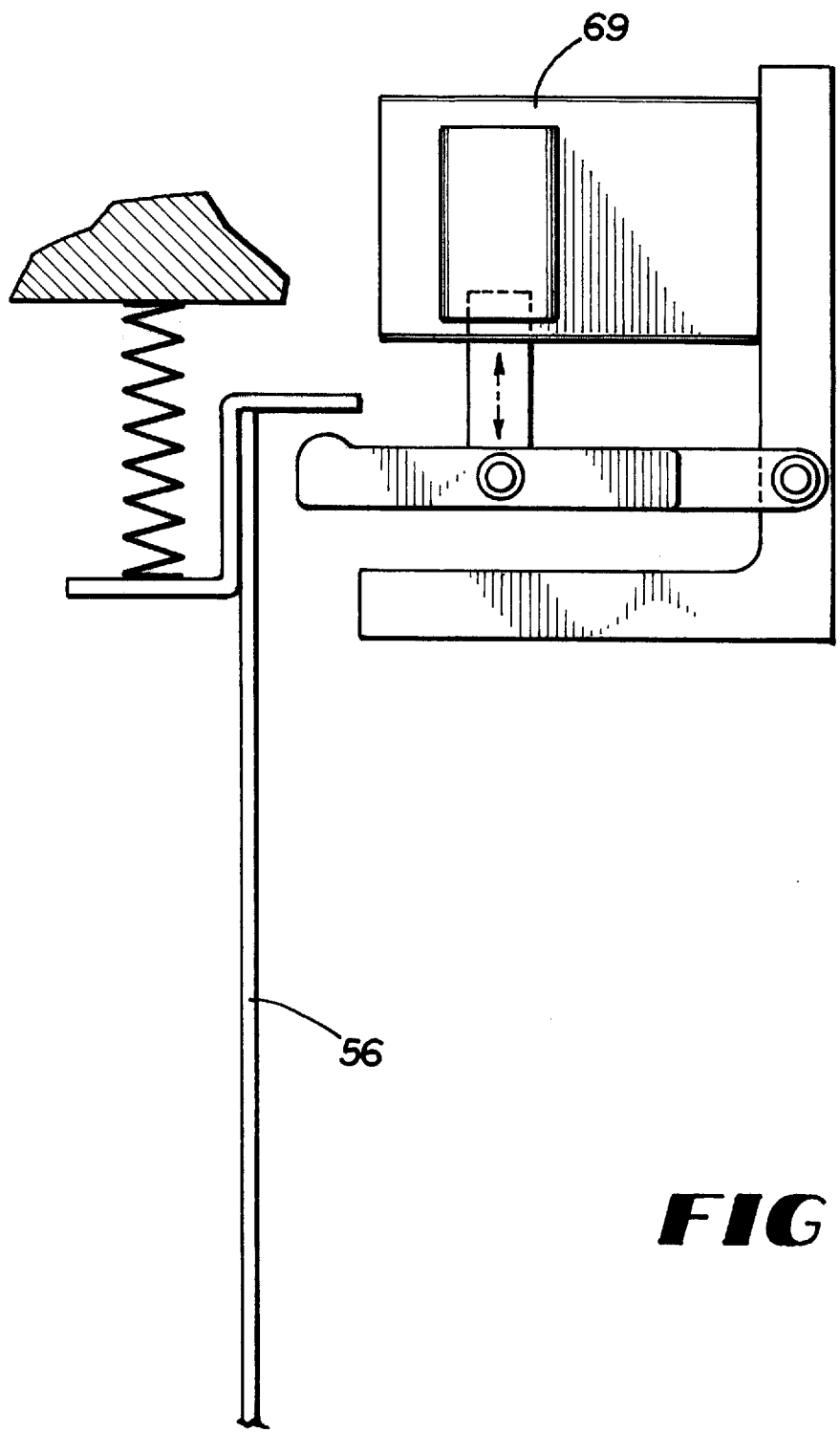
FIG. 8 is a side view of the solenoid control dipstick utilized in the present invention.

As part of the mechanism used selectively to lock a particular spider assembly 24 to the center column, the center column assembly 20 includes a teardrop dipstick 56. The dipstick 56 is a thin rectangular strip of metal approximately the length of the center column 22. The dipstick 56 is vertically secured to the side of the center column 22 which faces the suppression tree assembly when the center column 22 is in its home position. The dipstick 56 is constructed with a series of teardrop-shaped holes 58 arranged vertically one on top of the other along the height of the dipstick 56. The teardrop-shaped holes 58 are oriented so that the smaller end of each hole 58 is above the larger end of that hole 58. The dipstick 56 is operated by a mechanism as illustrated in FIG. 8 for raising and lowering the dipstick 56 at the appropriate times to assist further in securely locking and unlocking of spider. The configuration of the dipstick 56 of the present MegaSAR system allows the locking rod 54 to be shifted inward toward the center column 22 and partially through the larger portion of that locking rod's corresponding hole 58. However, after the locking rod 54 is inserted through the largest section of the appropriate hole 58, the dipstick 56 is moved vertically downward, thereby moving the locking rod 56 from the larger section of hole 58 where the fit was loose, to the smaller position of hole 58, where a more secure fit between the locking rod 56 and the hole 58 may be achieved.

To assist further in securing a particular locking rod 54 to the center column 22 via dipstick 56, a pick plate 60 is attached to the center column 22 between each pair of holes 58. Each pick plate 60 is a rectangular piece of metal with small rectangular notches 62 and 64 cut out of both the top and bottom edge of the pick plate respectively. The notches 62 and 64 are sized and oriented such that when a locking rod 54 is inserted through a hole 58 and the dipstick 56 moved vertically to secure a tighter fit, the locking rod 54 is positioned into the appropriate notch 62 or 64 of the corresponding pick plate 60, thus allowing the structurally strong pick plate 60 to receive the majority of forces directed toward pulling the locking rod 54 away from the center column 22.

When the locking and unlocking mechanism of the present invention is in its relaxed or nonenergized state, the locking rod 54 is resting in the suppression tree assembly 50, in line with the appropriate solenoid 52, with no connection existing between the locking rod 54 and the center column 22. Therefore, in normal operation, when a cartridge is selected, only the solenoid 52 corresponding to the spider assembly 24 containing that cartridge is energized. By energizing that solenoid 52, the corresponding locking rod is connected to the center column 22. The center column 22 with selected spider assembly 24 attached by the locking means is then rotated as needed to align the desired cartridge within the vertical column 32.

Normally, to bias the locking rods 54 outward—toward the suppression tree assembly 50 and away from the center column assembly 20—a return spring 66 is incorporated into the overall locking and unlocking mechanism used by each spider assembly 24. The return spring 66 has a diameter slightly larger than the locking rod 54 and is positioned over the end of the locking rod 54 nearest the center column 22. The return spring 66 is held in its desired position (within the spider assembly 24) along the locking rod by retaining rings 68 and 82. One end of the return spring 66 applies a force against a surface within spider arm 26. Given that retaining ring 68 provides a point along the locking rod 54 for the other end of return spring 66 to apply its forces, return spring 66 acts to force the locking rod 54 away from the center column and thereby prohibiting engagement or locking between a locking rod 54 and the corresponding pick plate 60 without the appropriate solenoid 52 being sufficiently energized to overcome the potential force of the return spring 66.

The end of the locking rod 54 located nearest the suppression tree assembly 50 interacts with the corresponding solenoid 52 in such a manner that when the solenoid 52 is energized, a solenoid plunger 70 moves within the solenoid 52 to force that particular locking rod 54 inward toward the center column 22 against the potential pressures of return spring 66. In addition to the solenoid plunger 70, each solenoid 52 includes a plunger return spring 72. The plunger return spring 72 encircles the solenoid plunger 70. The solenoid plunger 70 is supported by spring 72 in a ready state outward, and applies a constant biasing force against the solenoid plunger 70. This constant biasing force applied to the solenoid plunger 70 by the plunger return spring 72 pushes the solenoid plunger 70 outward, away from the center column 22. Therefore, to lock a particular locking rod 54 into the center column assembly 20, the inward force applied when the appropriate solenoid 52 is energized must overcome the outward forces exhibited by the return spring 66 and the plunger return spring 72.

However, once the previously energized solenoid 52 is de-energized, the plunger return spring 72 moves the solenoid plunger 70 outward, back to its ready state. The mechanism which unlocks or disengages the spider assembly 24 associated with that locking rod 54 from the center column assembly 20 is illustrated in FIG. 8. On command, a solenoid coil 69 is energized, moving dipstick 56 vertically upward so as to permit the large portion of teardrop hole 58 to disengage itself from locking rod 54, thus allowing the return spring 66 to move the locking rod 54 outward, there by unlocking or disengaging the assembly 24 associated with that locking rod 54 from the center column assembly 20.

Various other preferred elements are within the locking and unlocking mechanism of the present invention, as illustrated in FIG. 7, include a solenoid cable 74, a solenoid connector 76, a pilot bushing 78, as well as a stop bushing 80 and a retaining ring 82 for the outer end of locking rod 54. Each of these elements cooperate with the other elements included in the locking and unlocking mechanism for each spider assembly 24 to manipulate effectively and to hold the locking rod 54 and associated spider assembly in the desired position based upon the specific instructions received.

Figure 9A:
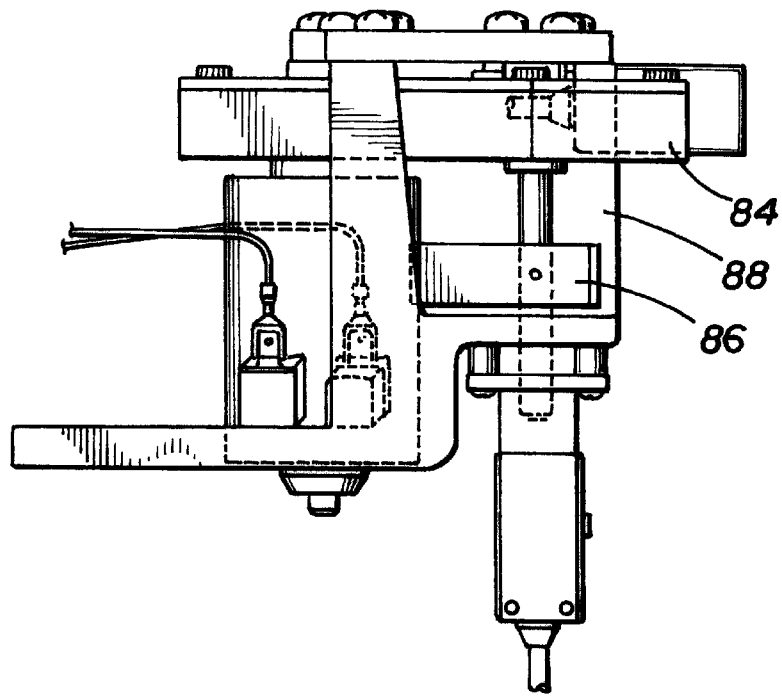
FIGS. 9A and 9B illustrate the knife motor assembly of the present invention.
Figure 9B:
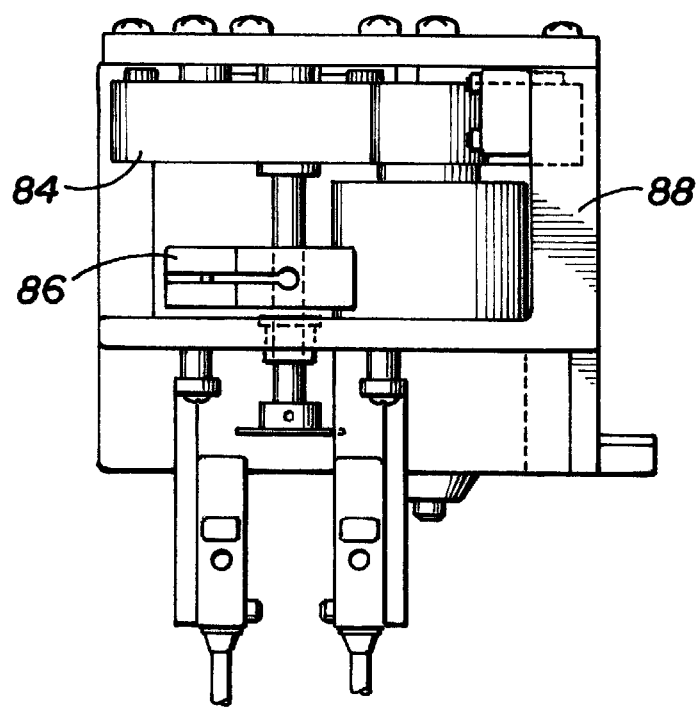

The knife assembly, as illustrated in FIGS. 9A and 9B, is a mechanism utilized by the present invention to hold the film cartridge (after having been selected and transported through the cartridge handling subsystem previously described) in a fixed position within the film handling subsystem. The knife assembly incorporates the use of photo sensors (which are described in further detail below). The knife assembly consists of a motor gearbox device 84. The motor gearbox device 84 has a locking cam 86 attached to the output shaft of the motor. These components are supported in a frame type housing 88 which permits the assembly of the unit into the film deck. Upon command (detection of the presents of a film cartridge in the film handling subsystem) the motor 84 is energized causing the locking cam 86 to rotate and pass between two rollers attached to the side of elevator 34. These rollers are spaced so as to equal the thickness of the cam 86. After a rotation of 180 degrees, the motor is de-energized and comes to rest in a position whereby the elevator 34 (with selected cartridge) is locked into the film deck to begin the film handling process. Upon completion of the film handling process, the motor 84 is again energized causing locking cam 86 to rotate 180 degrees, thereby disengaging with elevator 34, thus allowing elevator 34 to transport and store the selected cartridge into its designated position within the cartridge handling subsystem.

In summary, the overall operation of the cartridge handling subsystem provides an efficient and effective on-line method of locating the particular cartridge containing the requested image information out of 420 cartridges or possibly more resting in the various cradles of the system and maneuvering that cartridge into the proper position within the film handling subsystem, discussed immediately below, for further processing.

As detailed above, initially an elevator 34 is positioned below the spider assembly 24 containing the desired cartridge. The spider assembly 24 with the desired cartridge is then rotated until the cradle with the cartridge is aligned above the elevator 34 in the vertical column. Only the one spider assembly 24 containing the desired cartridge is rotated, all of the other spider assemblies 24 remain in the home position. The elevator 34 then moves vertically upward and lifts the cartridge out of the cradle. The elevator 34, continues to rise, carrying the desired cartridge upward until the cartridge is properly positioned in the film handling subsystem. The rotated spider assembly 24 remains in its rotated position until all desired processing of that cartridge is completed. The elevator 34 then descends to a position below the rotated spider assembly 24. As the elevator 34 drops through the rotated spider assembly 24 the cartridge gently releases itself from the elevator 34 and rests in its designated cradle. The spider assembly 24 then rotates back into its home position, and the cycle is complete. The preferred embodiment of the present invention is able to complete one complete cycle of returning a cartridge and presenting a new cartridge to the film handling subsystem. The movement of the elevator may be concurrent with the spider assembly 24 rotation in order to optimize the speed of cartridge retrieval.

FILM HANDLING SUBSYSTEM

The second functional subsystem of the preferred embodiment of the present invention is the film handling subsystem. The film handling subsystem incorporates various elements necessary actually to wind and to unwind the film in the loaded cartridge, as well as a mechanism for identifying the particular frame containing the desired image information and appropriately centering the identified frame within the optical path of the MegaSAR-420 system.

Figure 5:
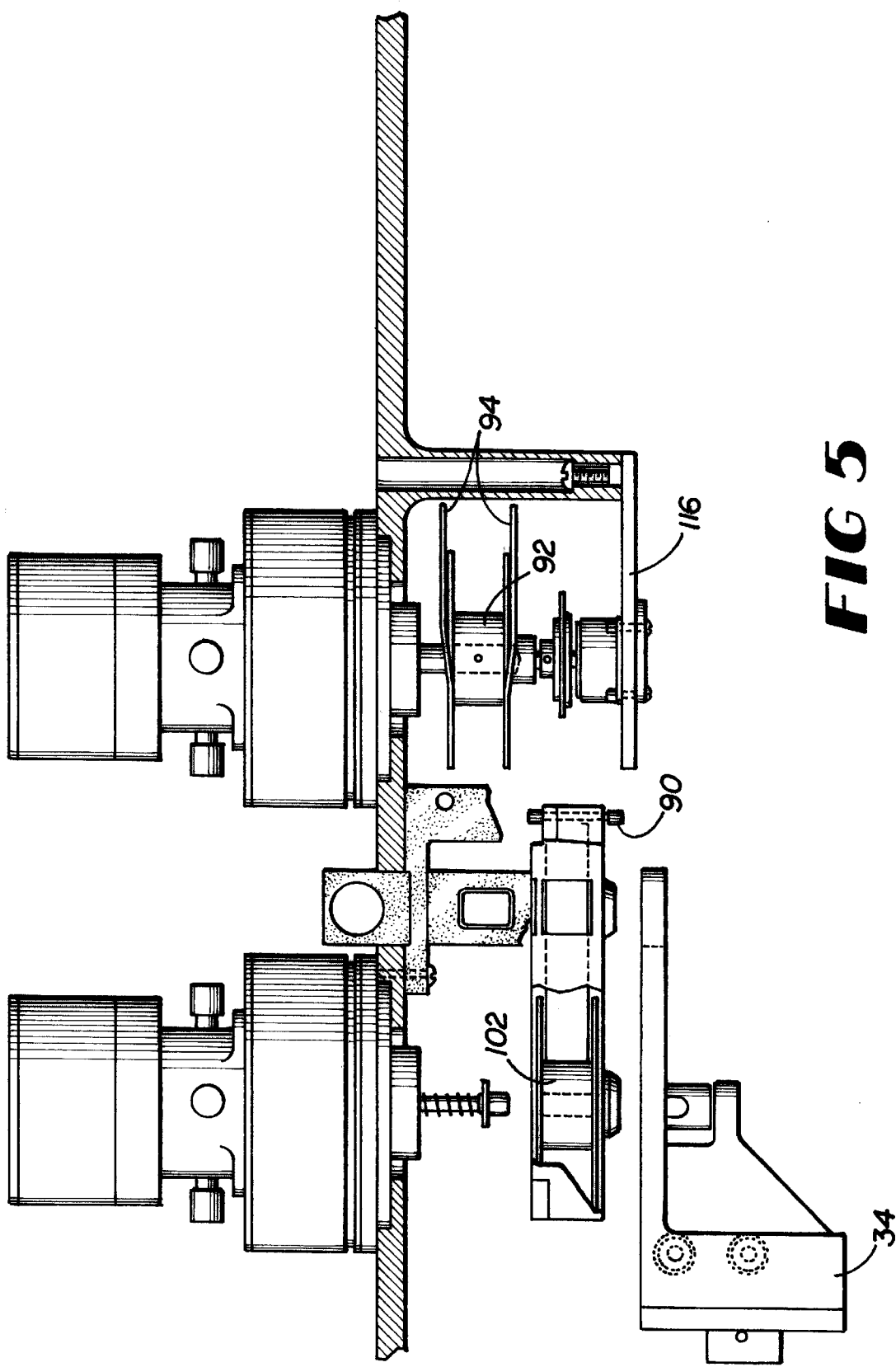
FIG. 5 is a side view of the film handling unit of the present invention.
Figure 13A:
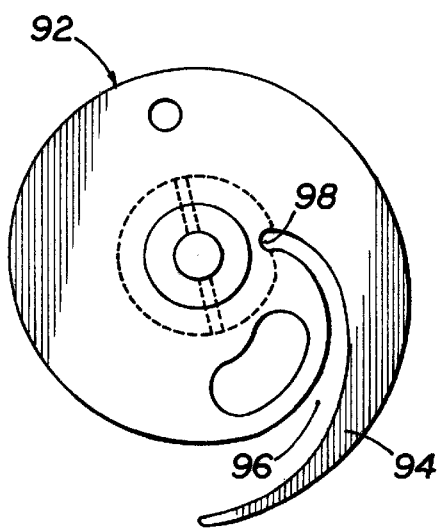
FIGS. 13A and 13B depict the take-up reel assembly of the present invention.
Figure 13B:
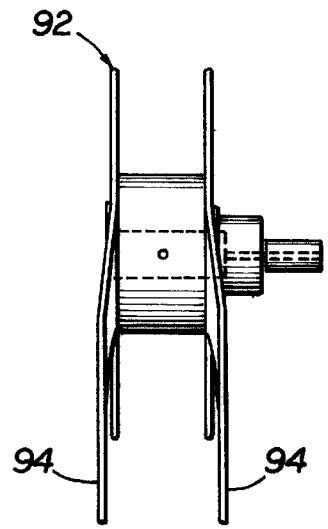

Once the cartridge containing the requested image information is properly loaded into the film handling subsystem from the cartridge handling subsystem, the film within the cartridge must be unwound to the particular frame which contains the desired image. As illustrated in FIG. 5, attached to the outermost end of the roll of film within the cartridge is pin 90. The ends of this pin extend above and below the cartridge. A take-up reel 92 contains take-up fingers 94 which, when properly positioned, grab the ends of the pin 90 and as the take-up reel 92 rotates, pull the film from the cartridge and begins winding the film onto the take-up reel 92, as shown in FIGS. 13A and 13B. To further facilitate the exchange of the film from the cartridge over to the take-up reel 92, the take-up reel 92 has a spiral groove 96 cut into each of the sides of the take-up reel 92. In addition, once the pin 90 is directed to the center core of the take-up reel 92, the pin 90 drops into a groove 98 along the center core of the take-up reel 92 to allow the film to wrap around the center core in a smooth manner.

As the film is exchanged from the cartridge to the take-up reel 92, it passes across the optical path of the MegaSAR-420 system. The optical path shown in FIG. 10 of the MegaSAR-420 system begins with a light source 100. In the preferred embodiment of the present invention the light source 100 is a projection bulb. The light emitted by projection bulb 100 is focused on the microfilm 102 by a condenser lens 104. The condenser lens incorporates the use of a green filter 106 and an IR filter 108 for optimum spectral performance.

There are two separate activities which occur while the film is illuminated in the optical path. The first, dealing with accurate identification of the desired frame, will be discussed immediately below whereas the second, dealing with the actual image scanning and processing performed after the proper frame has been identified, will be discussed in detail in the next section of this disclosure.

The manner in which the preferred embodiment accurately identifies the desired frame is by blip counting. There are a variety of methods employed to put image information onto microfilm, and a variety of formats which the image information may appear on the film. At present, the key method of tagging or marking frames is the use of blips. Blips are rectangular sections of completely exposed film outside of the actual stored image used to mark the position on the film at which one or more images have been exposed. By monitoring the blips located on the particular frames of the film as it passes through the optical path, a particular frame can be identified. The present invention includes a photocell array to monitor the blips. Any one of cells within the photocell array 110 may be used to detect blips. Furthermore, by selecting a photocell from the array, the relationships between the blips and the frame such as leading edge, centered and trailing edge can be controlled. Furthermore, on selecting different photocells, the relationships between the blip an the frame such as leading edge, centered and so on, can be controlled.

Figure 11:
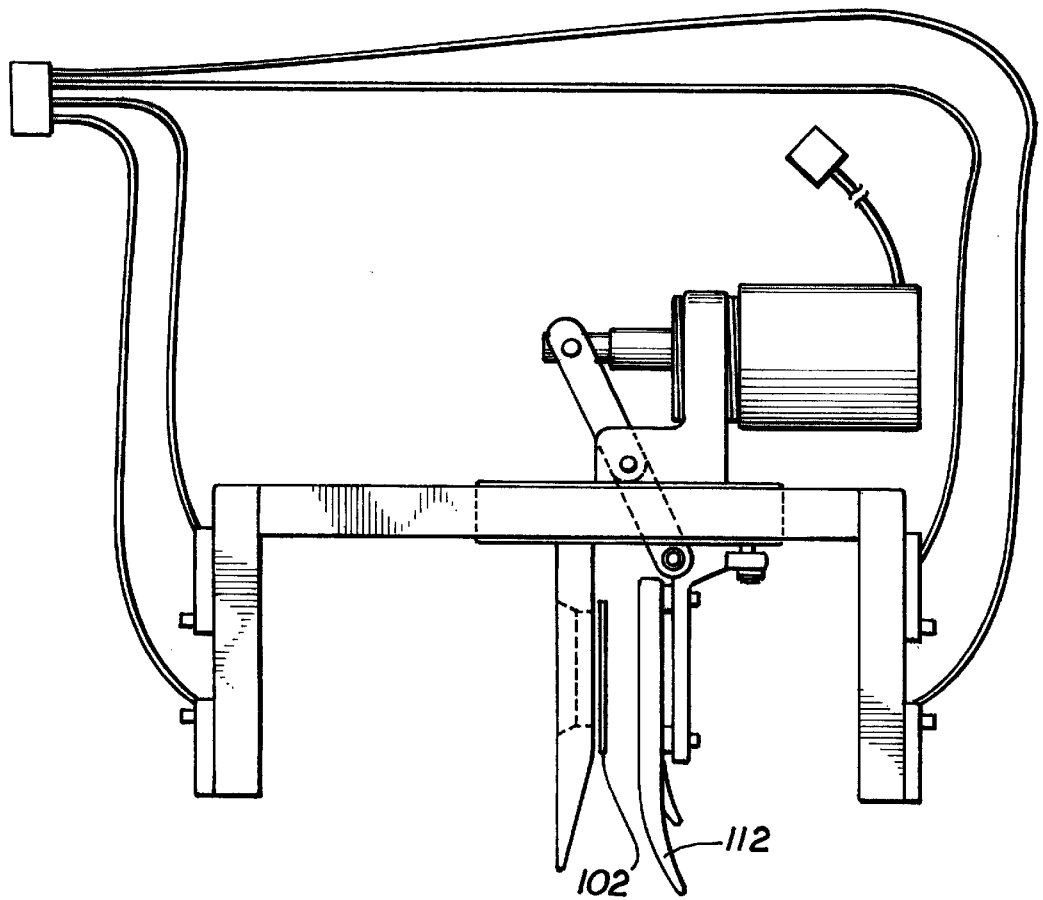
FIG. 11 is a side view of the film gate assembly of the present invention.

After the blip monitoring process described above has identified and properly aligned the frame containing the desired image information, the arm 112 of a film gate assembly as illustrated in FIG. 11 are moved to the closed position. The film gate is shown in FIG. 11 in both its open and its closed positions. When in the closed position, the film gate holds the film located between the cartridge and take-up reel in the proper plane required for the subsequent image processing to be performed accurately.

Figure 10:
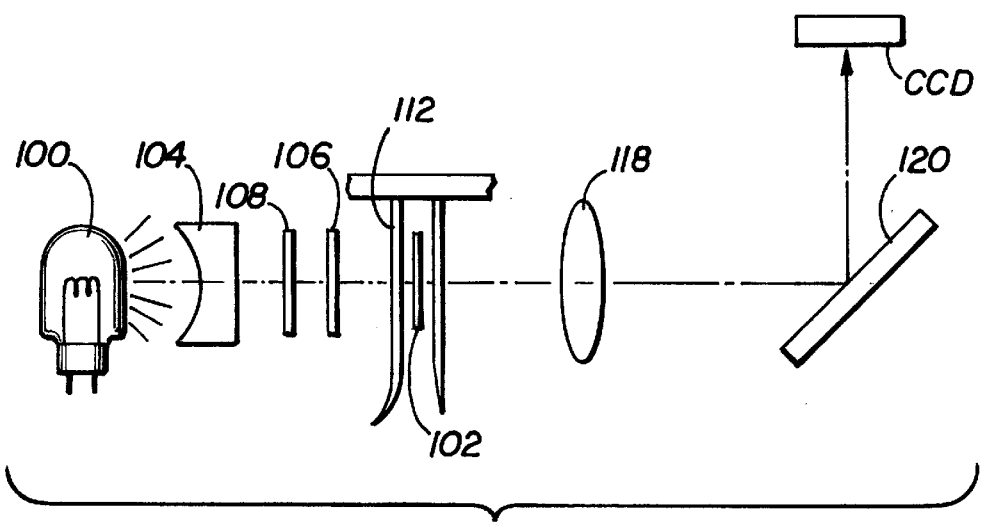
FIG. 10 is an exploded view of the components utilized in the optical path of the present invention.
Figure 12A:
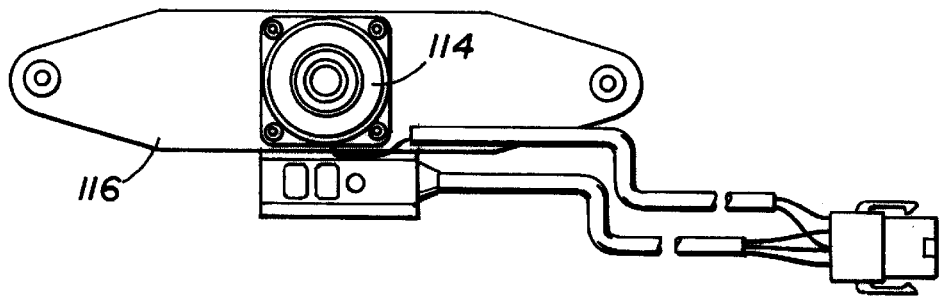
FIGS. 12A, 12B and 12C depict the break bridge assembly of the present invention.
Figure 12B:
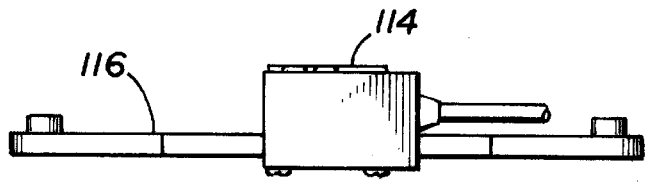
Figure 12C:
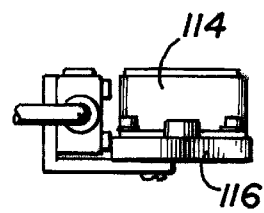

Being a component of the film handling subsystem as illustrated in FIG. 5, the brake assembly, as illustrated in FIG. 12, functions as a means of holding take-up reel 92 in a motionless state during the operation of the arm 112 (as shown in FIG. 10), thus allowing the 16 mm film 102 to remain stationary during the video image processing procedure. This is achieved through an electromagnet 114 attached to a support bar 116 and a photo sensor (described in greater detail below) which detects proper positioning of the take-up reel 92 prior to activation of the electromagnet 114.

The objective of the film handling subsystem is achieved once the desired frame is identified and securely held in its proper position within the optical path, as illustrated in FIG. 10, of the MegaSAR-420 system. With the completion of the duties performed by the film handling subsystem, the image information contained on the selected frame is ready for image processing steps, as discussed in the next section of this disclosure

VIDEO IMAGE PROCESSING SUBSYSTEM

The third functional subsystem of the preferred embodiment of the present invention is the video image processing subsystem. Once the cartridge handling subsystem has located the particular cartridge containing the selected image information and loaded that cartridge into the film handling subsystem, which locates the specific frame depicting the selected image and precisely positions it within the optical path, the video image processing subsystem begins its duties, which include image illumination, projection and focusing, as well as image scanning, digitizing and processing.

As stated earlier and illustrated in FIG. 10, the optical path of the present MegaSAR-420 system begins with a light source 100 which emits light through a condenser lens 104. In the next step of the optical path, the light passes through the film, and more specifically the desired frame, which is being held motionless by the film gate 112. Next, the light which now includes the image, passes through a lens 118 which optically amplifies the image on the microfilm. In order to conserve physical space, the present invention then turns the light ninety degrees (90°) by a mirror 120. The previous manipulation of the image focuses the image in the focal plane.

Figure 4:
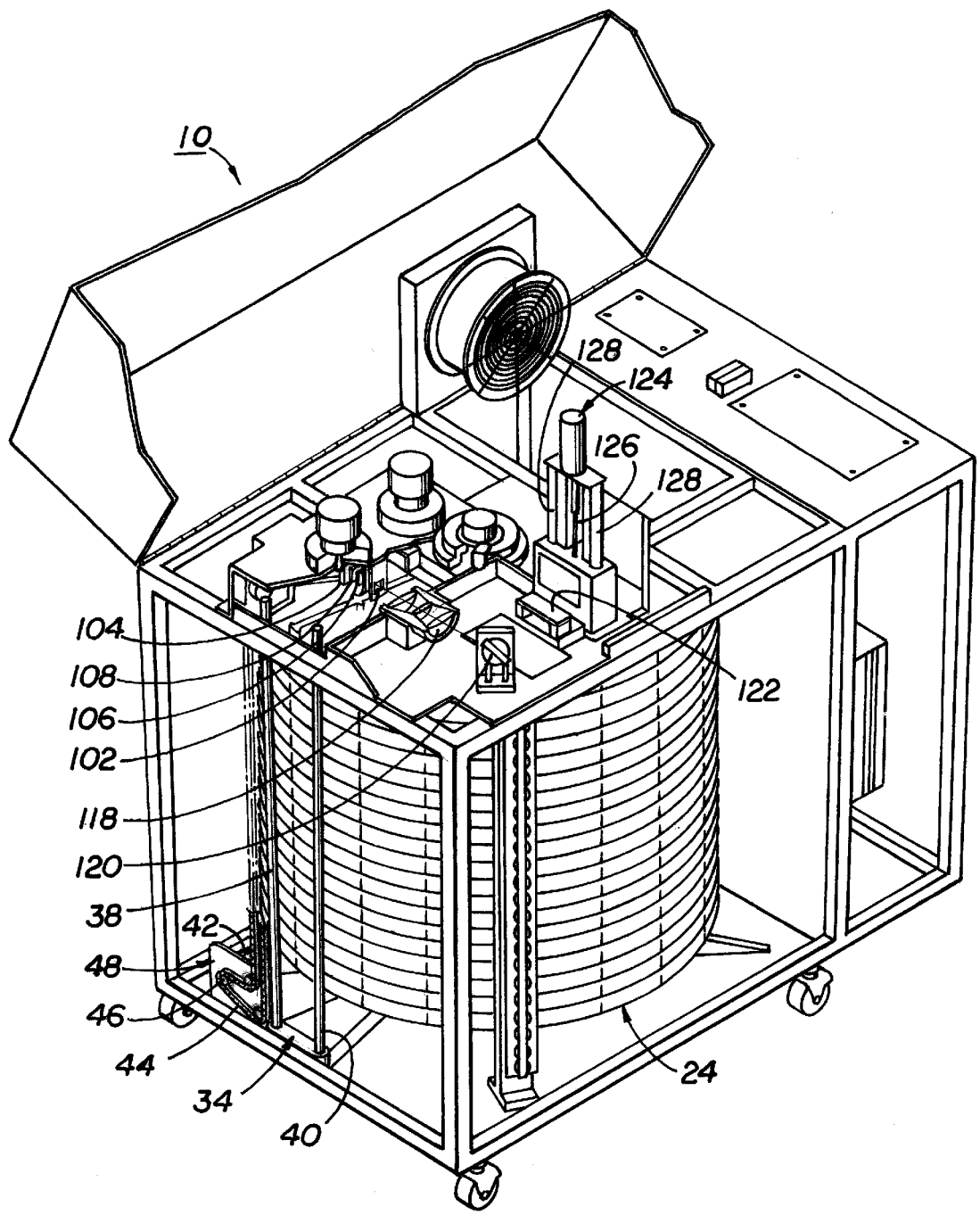
FIG. 4 is a perspective cut-away view of the storage and retrieval unit of the present invention.

In the preferred embodiment, as depicted in FIG. 4, a scanner board 122 is positioned within the focal plane and mounted to a vertical scanner 124. The vertical scanner 124 may be maneuvered vertically within the focal plane by a direct-drive screw arrangement 126. Vertical posts 128 are used to constrain the motion of the vertical scanner 124. In the configuration of the present invention, the vertical scanner 124 can move from any position to any other position within the focal plane with a completely smooth and regular motion, at a speed sufficient to keep up with the fastest scanning electronics presently existing.

As shown in FIG. 4, the scanner board is a charge couple device or CCD (not shown). The CCD is a device which converts various light intensifies to proportional electrical voltages. The CCD contains a horizontal array of cells which may be configured to include either 2048 or 3456 or 5000 individual cells depending on the resolution requirement of the film being processed.

The CCD captures a linear array of pixels in order to create a scan line with each of the pixels representing a tiny square of light intensity. The scanner board 122 may be moved in such a manner as to produce the appropriate number of scan lines needed to properly reproduce the desired image on either a display screen or a printer. The speed of the scanning motion depends on the resolution requirement.

The CCD may have a width of 1728 or 3456 elements. The MegaSAR-420 system of the present invention can be commanded to produce exactly the desired number of scan lines, but the number of pixels/line is fixed.

From the CCD, the image passes through a number of stages of processing prior to being presented to the user. The analog signals produced by the CCD are first amplified and cleaned during a pre-processing phase. The signals are then converted to a binary value by an A-to-D converter, which in the present invention produces eight bits per pixel. Eight bits produce 256 different combinations, which means that 256 shades of grey can be represented. Processing of the digitized image may be done using one of the two techniques described in detail below.

First, a particular eight-bit value may be used as a threshold to convert the grey scale image to a binary image (black-and-white), containing just one bit per pixel. The image may be inverted at this time to accommodate clear images on a black background. A binary image typically consists of a half million or a million bytes, and may be compressed by the controlling computer to about one tenth that size.

Second, the gray scale may be fed to an integral image enhancement processor, which uses sophisticated algorithms in a context-sensitive way to determine for each pixel whether it is foreground or background. The output of the image enhancement processor is a binary image. The operation of the enhancer is in real time.

All sensors in the MegaSAR-420 are implemented using infra-red beams of light which are either broken or bounced back. The use of infra-red avoids interference with ambient light. An LED shows whether the sensor is on or off, thus providing a simple way to verify sensor operation.

OPERATIONAL CONTROL SYSTEM

Maintenance is aided by the fact that the MegaSAR-420 includes an integral 486-based or "Pentium"™ PC including a hard disk. A connection on the control panel permits service personnel to plug in an ASCII terminal, a PC with terminal emulation or a modem for remote diagnosis and monitoring. Diagnostic and monitoring programs may be run while the MegaSAR-420 is in normal operation, thus permitting intermittent problems to be caught.

THEORY OF OPERATION

Prior to beginning the actual storage and retrieval process, the MegaSAR-420 system of the present invention may initiate one or both of the calibration phases of operation available. In the two calibration phases of the present invention, the physical location and operability of the elements involved in the movement of both the elevator and the individual columns are verified.

Figure 14:
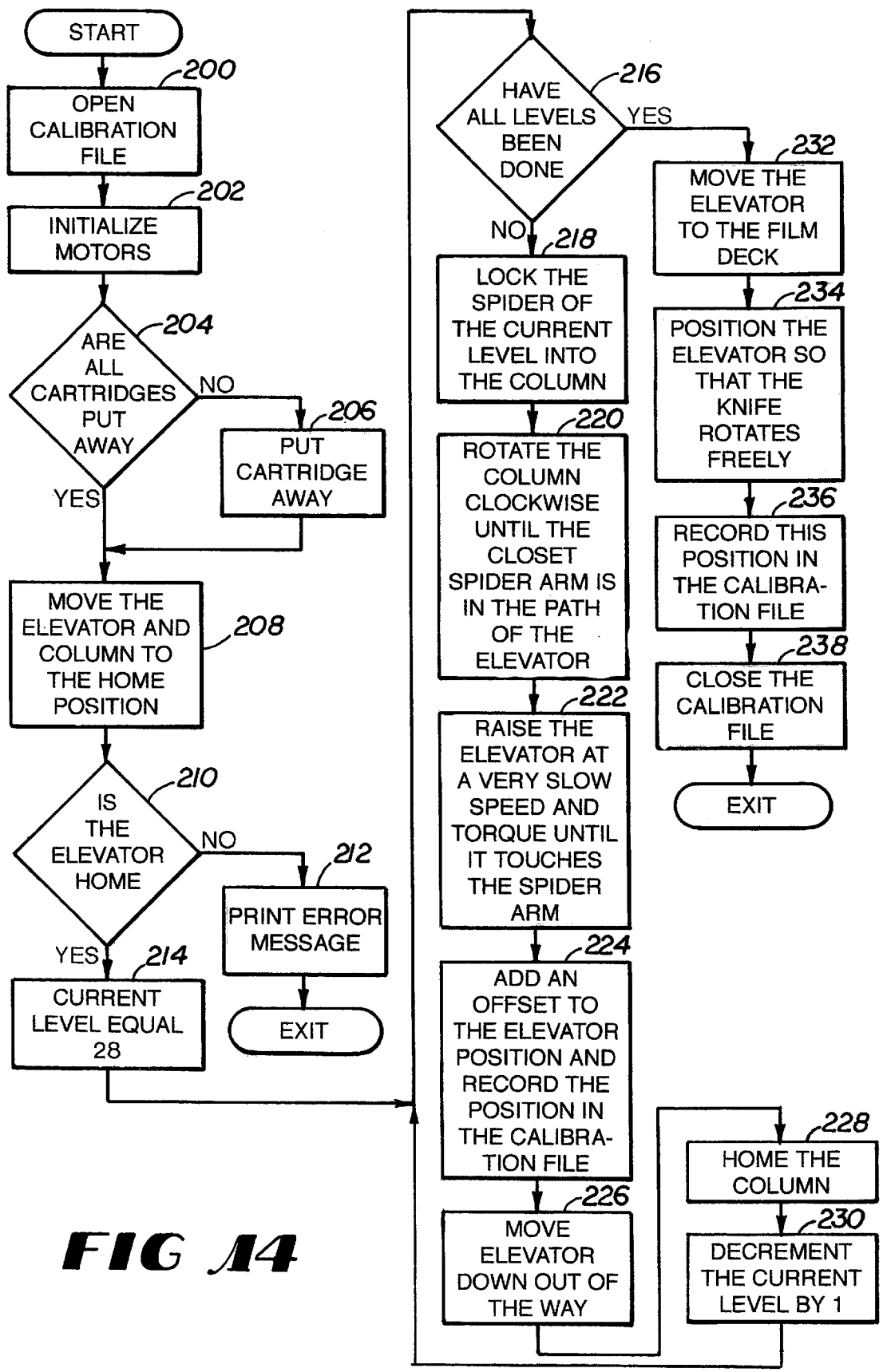
FIG. 14 is a flowchart which functionally describes the elevator calibration process of the present invention.
Figure 15:
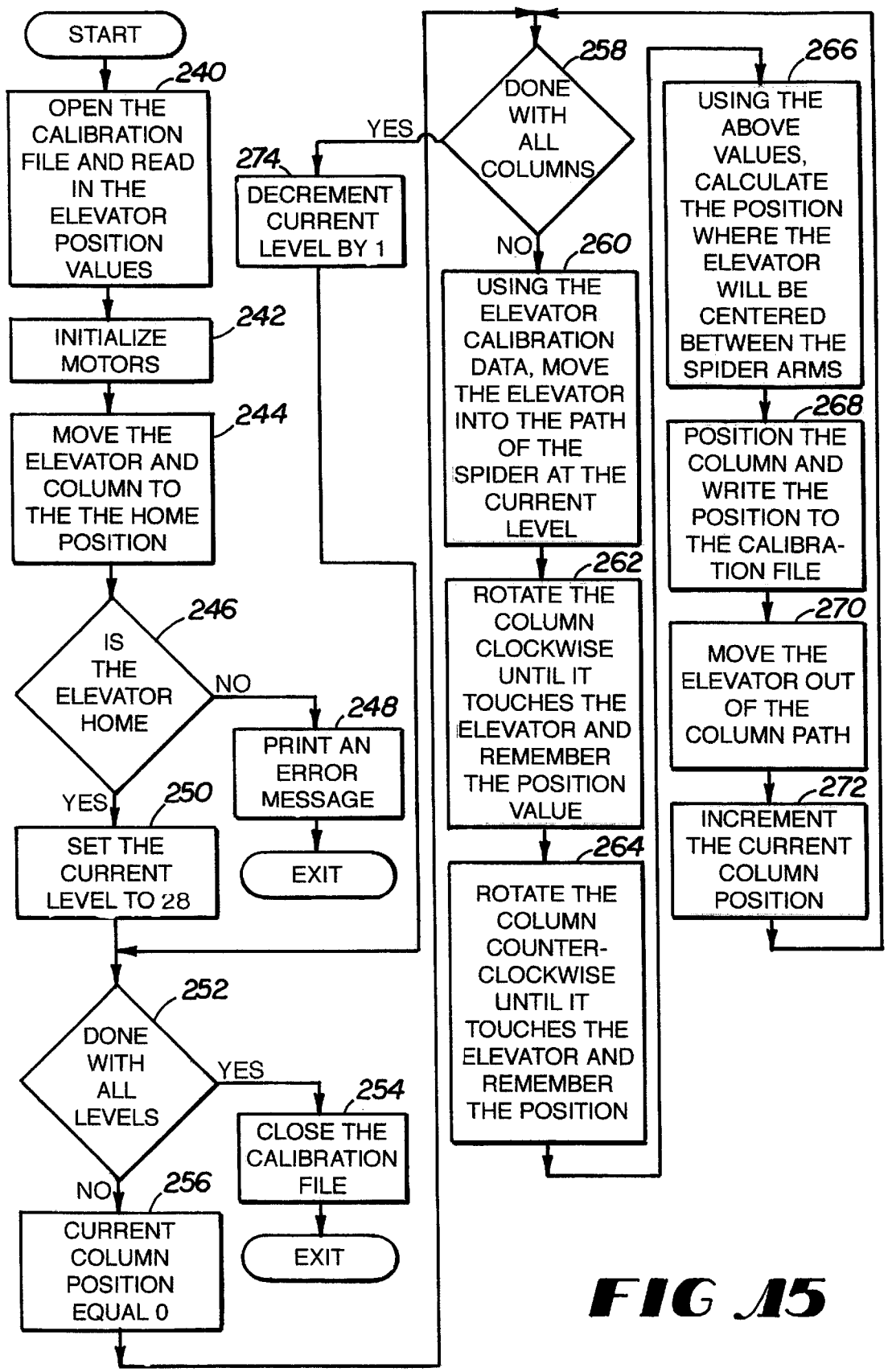
FIG. 15 is a flowchart which functionally describes the column calibration process of the present invention.

The flowcharts set forth in FIGS. 14 and 15 provide a functional description of the manner in which the microprocessor of the present invention is programmed in order to carry out either one of the two calibration phases of the present invention. FIG. 14 depicts the steps employed to calibrate the motion of the elevator within the present invention. In the preferred embodiment, the elevator calibration phase is followed by a phase which calibrates the various columns of each level. The particular steps performed to calibrate the columns are depicted in FIG. 15. Implementation of the flowcharts 14 and 15 in terms of specific programming steps will vary somewhat, depending on the particular microprocessor hardware chosen.

Referring first to FIG. 14, an elevator calibration sequence is commenced by enabling the microprocessor with an elevator calibrate command signal may be generated as a result of electrical power being supplied to the MegaSAR-420 unit or by directly activating the calibrate command signal during operation to provide further system verification. As represented by block 200, the microprocessor responds to the elevator calibrate command signal by opening a calibration file or memory within the unit and reading in data indicative of the positional values of the elevator and columns. The position data may be obtained from a number of different types of well-know sensors positioned at particular points of interest throughout the MegaSAR-420 unit of the present invention. In the preferred embodiment, the positional data may reflect the vertical position of the elevator as well as the rotational alignment of each column.

The next operation executed by the microprocessor, as represented by block 202, is to initialize each of the motors utilized to raise and lower the elevator. Upon completion of the motor initialization process, a check is made to verify that all of the individual film cartridges are properly stored in their appropriate carriages, as illustrated by decision block 204. If not, then the out of place cartridge is restored as indicated by block 206. The microprocessor then proceeds to block 208, where the system generates the necessary commands to move the elevator and all of the columns to their home position.

Once the elevator and columns are positioned in what is believed to be the home position, and all cartridges properly restored, a verification that the elevator is indeed in its home position is made, as indicated by decision block 210. Should the data returned from the sensors indicate that the elevator is actually not in its proper home position, an error message is printed in accordance with block 212 and then the calibration phase of the present invention is terminated.

However, upon verification that the elevator is indeed in its proper home position, a current level value is set to equal the number of levels or spider assemblies present within that particular storage and retrieval unit in the preferred embodiment, this number is twenty-eight (28), as depicted by block 214. The current level value is used within the microprocessor to keep track of the particular column level to which the elevator position is being calibrated to at any given time during the elevator calibration process. Next, in accordance with decision block 216, the microprocessor makes a determination as to whether the elevator has been calibrated to all of the levels. If all levels have been processed, then the elevator is moved up to the film deck for further calibration, as will be discussed in greater detail later. However, if all levels have not been processed, then as depicted by block 218, the particular spider assembly associated with the current level to which the elevator is being calibrated is then locked into the center column as set forth earlier.

Once the proper spider assembly is locked into the center column, the center column is rotated clockwise until the closet spider arm has been moved into the path of the elevator, in accordance with block 220. Then as indicated by block 222, the elevator is raised at a very slow speed and low torque until the elevator makes contact with the rotated spider arm. To record the desired alignment of the elevator when positioned adjacent to that particular level, an offset value of a predetermined amount is added to the detected position of the elevator and then stored in the calibration file of the MegaSAR-420 unit, as depicted by block 224. Upon recording the desired elevator position relative to the level in question, the elevator is lowered to a height which will allow an unobstructed return of the rotated spider arm to its home position as illustrated in block 226. The center column and rotated spider arm are then repositioned to their home position as depicted in block 228.

After the particular level which has just been calibrated has been returned to its home position, the current level value is decreased by 1 in accordance with block 230. The microprocessor then returns to decision block 216 where once again it is determined whether all of the levels have been calibrated. As long as there remains any levels which have not been calibrated, the steps of blocks 218 through 230 are repeated.

However, once block 216 makes the determination that all of the levels have been calibrated via the steps of block 218 through 230, the microprocessor generates commands to move the elevator up to the film deck as set forth in block 232. Then, as illustrated by block 234, the elevator is positioned very close to the film deck, so as to allow the knife to rotate freely. Such positioning of the elevator allows the knife to properly remove a cartridge from the elevator and place this cartridge into the film deck. The desired position of the elevator for the cartridge transfer from elevator to film deck is then recorded in the calibration file, as depicted by block 236. Upon recording this position, the microprocessor may close its calibration file and thus complete the elevator calibration phase of the present invention as illustrated by block 238.

A second phase of calibration which may be performed by the MegaSAR II unit of the present invention performs the precise measurement and alignment of each of the columns within the unit. The particular procedures performed to properly calibrate the various columns are functionally described in the flowchart of FIG. 15. The beginning steps involved by the microprocessor are nearly identical to those performed during the initial stages of the elevator calibration phase. That is, the calibration file is opened and the value indicative of the position of the elevator is read into the calibration file as represented by block 240. Then the appropriate motors are initialized as illustrated by block 242. However, a slight deviation from the previously described elevator calibration phase, the loop involving determining if the cartridges are all properly stored, and accordingly, restoring any out-of-place cartridges is not repeated in the column calibration phase. Instead, after initializing the motors in accordance with block 242, the elevator and column are moved to their home position as depicted by block 244.

Upon positioning the elevator and columns in their home position, a verification is made in accordance with decision block 246 determining whether the elevator is indeed in its proper home position. If the elevator is indicated as not being in its home position, an error message is reported to the operator and the column calibration phase terminated or depicted in block 248. However, as in the elevator calibration phase, a current level value is set equal to the number of levels or spider assemblies present within the particular storage and retrieval unit in the preferred embodiment, this value is twenty-eight (28) as depicted by block 250.

Since each of the cradles within each level of the storage and retrieval unit must be calibrated, decision block 252 represents the means by which the system determines whether each level has had its associated cradles calibrated. Upon determining that each of the cradles of all of the levels have been calibrated, the calibration file is closed and the column calibration phase terminated as depicted by block 254.

However, as long as decision block 252 indicates that all of the levels have not been calibrated, the microprocessor proceeds to set a value representative of the current column position equal to zero as set forth by block 256. Decision block 258 represents the next step performed by the microprocessor in that the column calibration process been performed on each of the column or cradles present on that level or spider assembly.

As long as there remain columns on the chosen level which have not been calibrated, the microprocessor then uses the data collected during the elevator calibration stages to precisely move the elevator into the path of the spider assembly at the current level, as depicted in block 260. Then, in accordance with block 262, the center column is rotated clockwise until the spider arm makes contact with the elevator. The precise location of this position is then stored for use in later calculations. As depicted in block 264, the center column is then rotated counter clockwise until the appropriate spider arm again makes contact with the elevator. Likewise, the precise location of this position is stored.

The microprocessor then uses the two stored values, representative of the position of contact between the elevator and spider arms described above, to calculate the appropriate position for that cradle or column which allows the elevator to be precisely centered between the two spider arms creating the cradle in question as depicted by block 266. The center column is then moved to the calculated centering position so that the desired centering position may be recorded into the calibration file in accordance with block 268.

Once that cradle or column has been calibrated, the elevator is moved out of that column path, as illustrated by block 270. Then in accordance with block 272, the microprocessor increments the value representing the current column position by one and proceeds back to the step depicted by decision block 258. At this point of the column calibration phase, it is once again determined whether the column calibration process described above has been performed on all of the columns or cradles in the particular level being checked. As long as there remain columns which have not be calibrated, the steps depicted in blocks 260 through 272 are repeated.

However, once all of the columns on the current level have been calibrated, the microprocessor decreases the value representing the current level being calibrated by one, as depicted by block 274, and returns to decision block 252. Decision block 252 then, once again, determines if all of the levels within the storage and retrieval unit have had their columns calibrated by the procedure of the present invention as described above; if not, the steps set forth in blocks 256 through 274 are repeated.

As stated above, each column or cradle of the level being processed is calibrated according to the step depicted in blocks 260 through 272. Then the microprocessor generates commands which initiate the column calibration process for the various columns associated with the next level. This repetitive procedure is sequentially performed on each column or cradle of each level present in the storage and retrieval unit being calibrated. In the preferred embodiment of the present invention, the column calibration phase will include the calibration of 420 columns or cradles since the preferred embodiment employs twenty-eight (28) levels or spider assemblies, each level having 15 columns or cradles. As stated earlier, the column calibration phase of the present invention is completed only after it is determined by decision block 252 that each level has had its associated columns calibrated. Then, in accordance with block 254, the calibration file is closed and the column calibration phase terminated.

After the MegaSAR-420 system of the present invention has completed the selected calibration phases, the system is ready to enter its normal mode of operation. FIG. 16 is a functional description of the positional procedures involved in the standard method used by the present invention to use an on-line personal computer to activate and control a multiple cartridge storage and retrieval system.

The first step, as depicted by block 276, is for the microprocessor to initialize the system. The initialization of the system includes, among other things, placing the elevator and columns in their home position and activating communication link between the personal computers and the storage and retrieval unit. Following system initialization, the microprocessor continually monitors any incoming signal from the operator to determine when a command has been received as depicted by decision block 278 and the associated loop. As illustrated, the new command monitoring continues until a command has been received. Upon receipt, the command is decoded by the microprocessor, as indicated by block 280.

As stated earlier, there are a variety of commands which may be requested by an operator. As depicted by decision block 282, should the HOME command be received, it, once again, initializes the system and the proceeds to continue monitoring for subsequent commands from the operator. However, as illustrated in blocks 284 and 286, should the decoded command not be a HOME command but is instead a LOAD command, the microprocessor performs the steps as set forth in FIG. 17.

The LOAD command is only used by the operator when he desires to load a cartridge into the storage and retrieval unit for the first time. Thus, the LOAD command may be used to add new cartridges to the unit or reposition within the unit cartridges which had to be physically removed from the storage and retrieval unit for one reason or another. Some such reasons may include repairing a damaged cartridge or updating the data on a particular cartridge.

As illustrated in block 288 of FIG. 17, upon the command of the operator, the microprocessor gets the desired cartridge address from the command decoder. In the preferred embodiment of the present invention, the cartridge address contains a two-digit valve representative of the level the cartridge is to be loaded into (referred to herein as LL) in combination with another two-digit value representing the column position where the cartridge is to be placed (referred to herein as PP). Therefore, the cartridge address may be represented as (LL, PP). The operator then selects level LL, in accordance with block 290. Following the selection of the desired level, that level is rotated so that position PP is aligned within the elevator path as depicted by block 292. The microprocessor then generates commands to move the elevator in its position closet to the door located in the front panel of the MegaSAR-420 unit, in accordance with block 294. As illustrated by blocks 296 and 298, the operator then opens the loading door and physically loads the new cartridge onto the elevator. In accordance with block 300, the operator may close the loading door by pressing any key on the keyboard associated with the personal computer. After the door is closed, the elevator is then moved so as to be aligned with a cartridge sensor, as depicted by block 302. The cartridge sensor is used to verify that a cartridge was indeed loaded into the elevator. As illustrated by decision block 304, should a cartridge not be detailed on the elevator, an error message in accordance with block 306 is conveyed to the operator and the load cartridge phase is terminated. However, should decision block 304 indicate that a cartridge is present on the elevator, then as depicted by block 308, the new cartridge is stored into the selected location (LL, PP) and the load cartridge phase is successfully completed.

Now referring back to FIG. 16A again, should the operator wish to request a particular image for viewing, he may generate the image request command through the microprocessor. Upon decoding of an image request command by block 280 and recognition of the command as an image request, in accordance with decision block 310, the microprocessor proceeds to decision block 312. Decision block 312 determines whether a cartridge is properly positioned within the film deck. If there is a determination that a cartridge is located in the film deck, the microprocessor, in accordance with decision block 314, determines whether the next image requested is located on the cartridge presently located in the film deck. Then if it is determined via decision block 314 that the next image requested is not located on the particular cartridge, already located in the film deck, the cartridge presently in the film deck is removed from the film deck and restored in its proper cradle position with the storage and retrieval unit as depicted by block 316 and further illustrated in FIG. 18.

Figure 18:
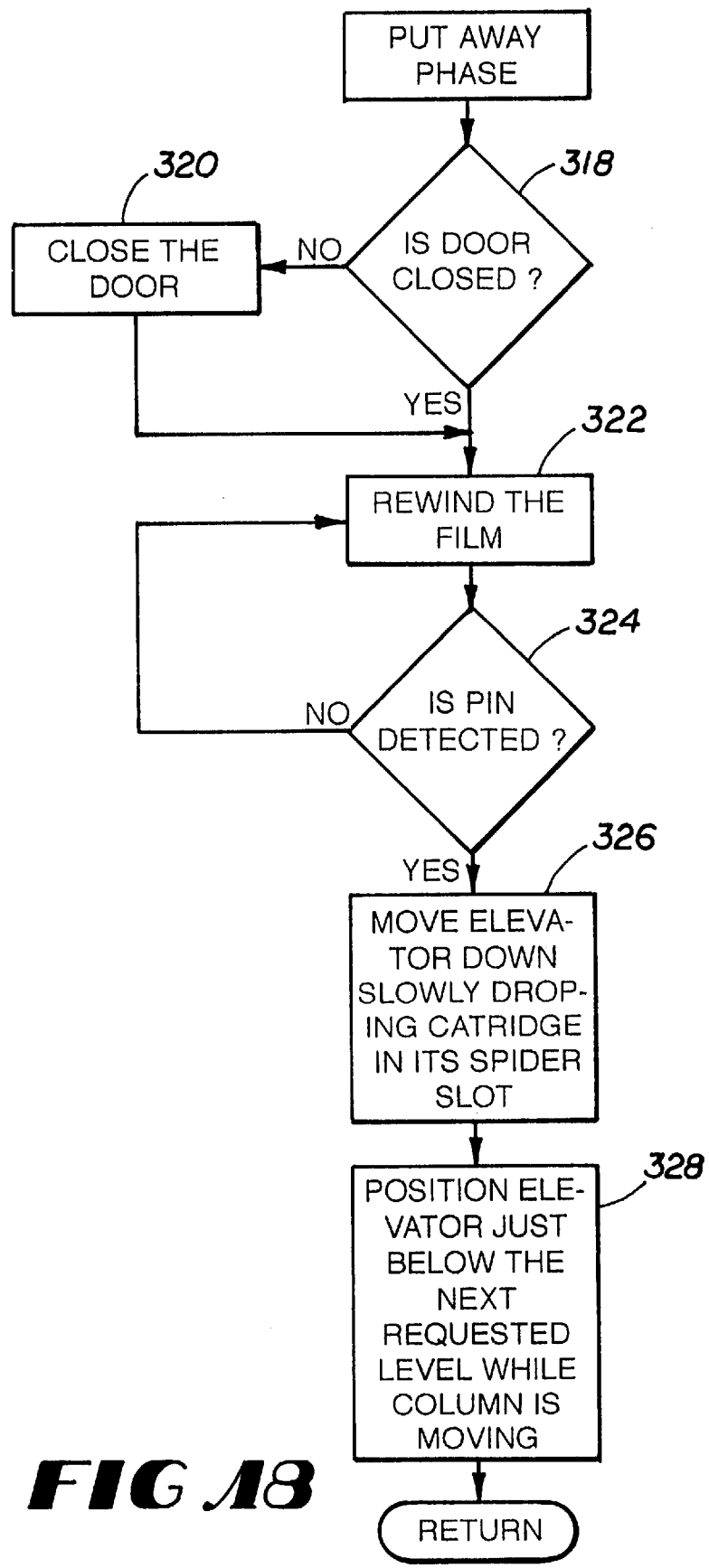
FIG. 18 depicts the steps involved in the put-away phase of the present invention.

The present invention utilizes a Put-Away phase to remove an undesired cartridge from the film deck and return that particular cartridge to its appropriate position within the unit. The steps involved in the Put-Away phase of the present invention is depicted in the flowchart of FIG. 18. To begin the Put-Away phase, a verification, as illustrated by decision block 318 is made to assure that the loading door on the front panel of the MegaSAR-420 unit is closed. If the loading door is determined to be open, the microprocessor may send a signal, causing the door to be closed in accordance with block 320.

Once the loading is determined to be properly closed via decision block 318, the film present in the undesired cartridge is rewound, as depicted by block 322. As depicted by decision block 324 and the associated loop back to block 322, attempts are made to rewind the film until acknowledgement is received at a proper PIN detection. After the film in the cartridge to be restored has been properly rewound, the elevator is lowered slowly, as illustrated by block 326. Since the cartridge to be replaced is fully supported by the elevator plate and the level from which this cartridge was removed is still rotated into the elevator path, the lowering of the elevator through the proper cradle allows the cartridge to softly come to rest within the appropriate cradle. As illustrated by block 328, the elevator may then be positioned immediately below the level containing the next requested image. Simultaneously, the present invention causes the level holding the cartridge previously removed from the film deck to be returned to its home position by engaging the proper spider assembly and rotating the center column. Such rotation removes all cartridges from the elevator path and sets the storage and retrieval unit in a ready position to process the next image, thereby completing the Put-Away phase of the present invention.

Figure 16B:
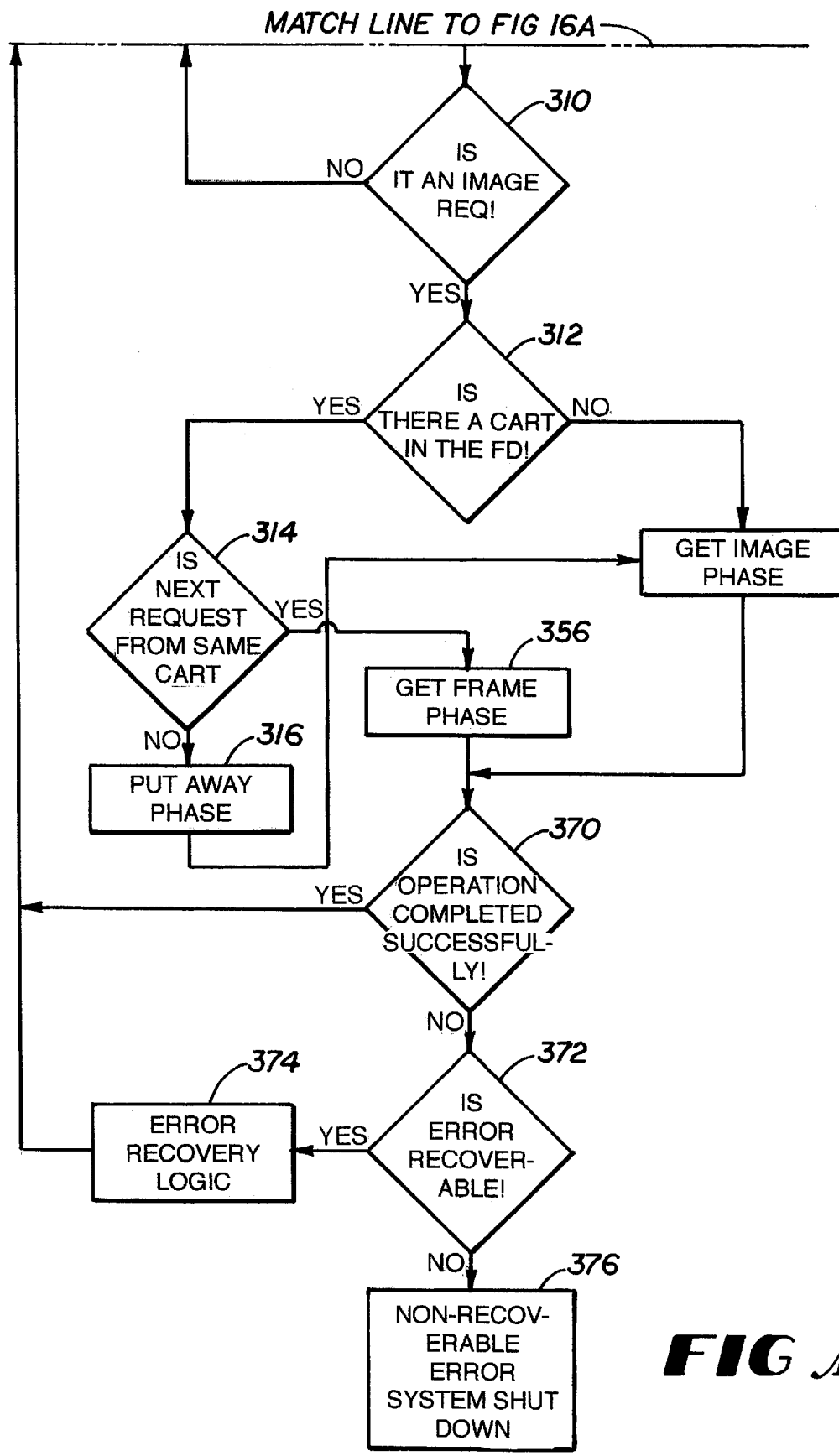
FIGS. 16A and 16B depict the overall operation of the storage and retrieval process of the present invention.
Figure 16A:
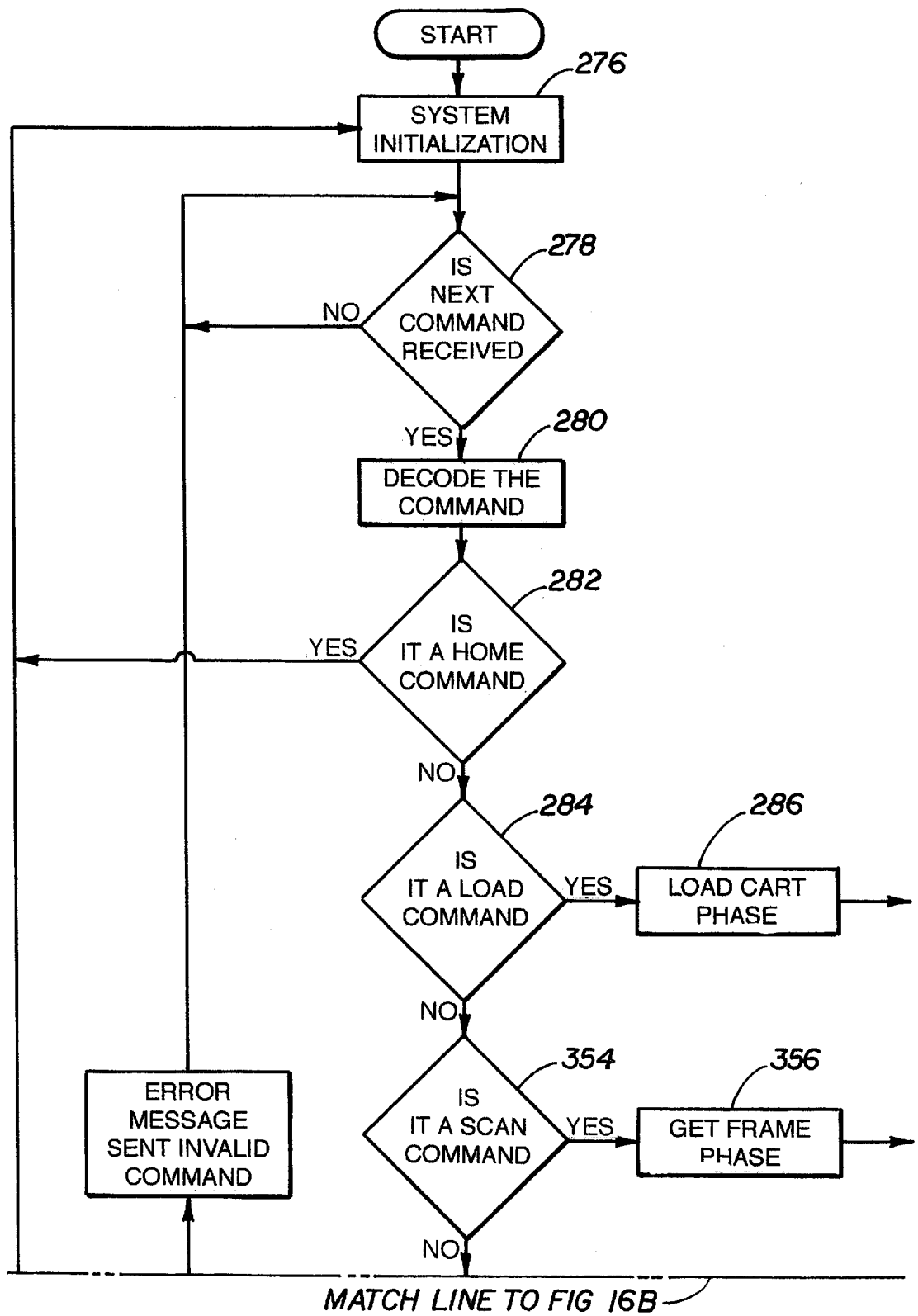
Figure 19:
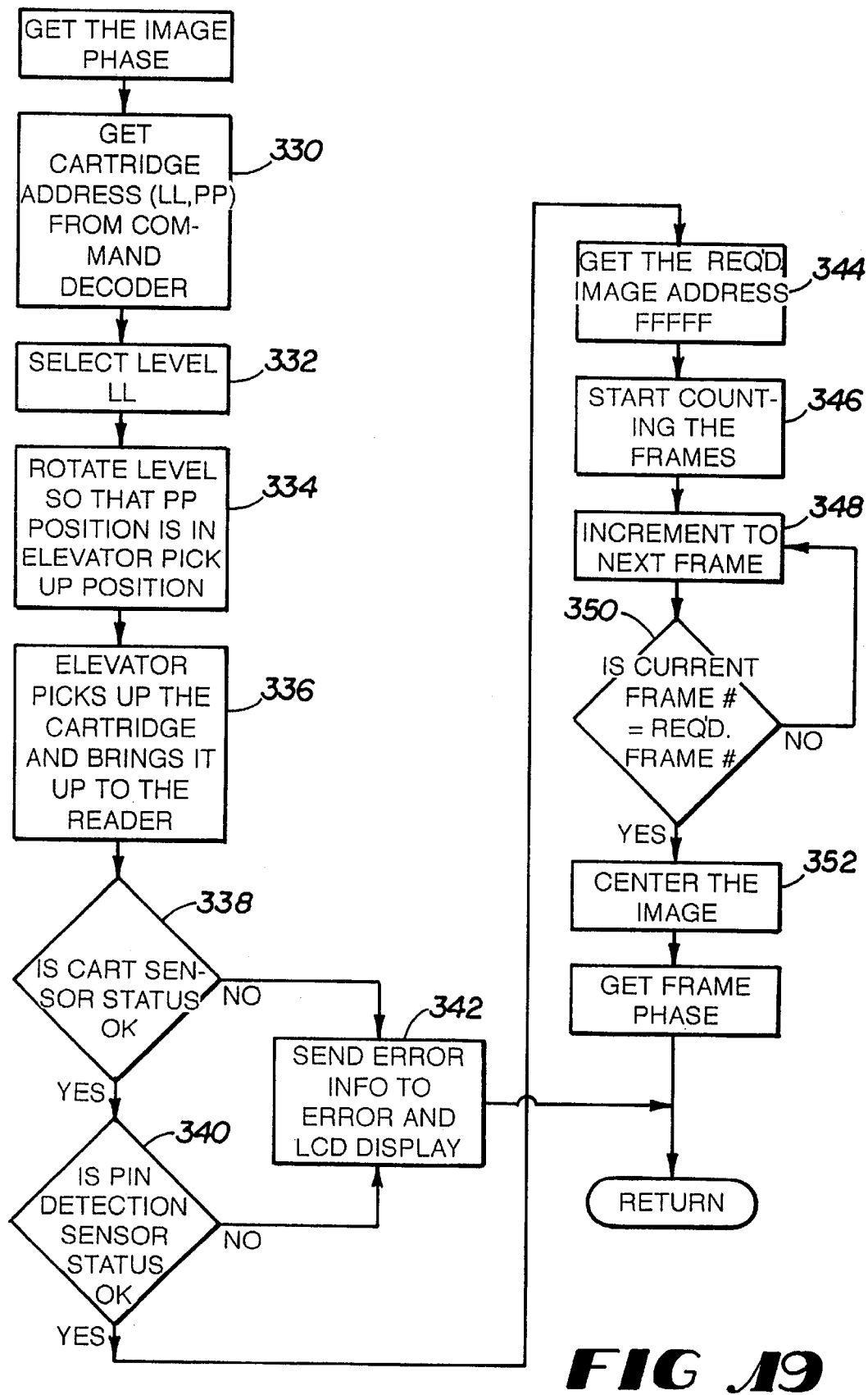
FIG. 19 depicts the steps involved in the get image phase of the present invention.

However, now referring once again to decision block 312 of FIG. 16A, once it is determined that there is not a cartridge present in the film deck, either because a cartridge has not been located in the film deck or that the Put-Away phase described above has been completed, then the microprocessor generates the appropriate signals to carry out the Get Image phase of the present invention. The Get Image phase of the present invention is functionally described in the flowchart of FIG. 19.

The initial step involved in the Get Image phase of the present inventions is to acquire the appropriate cartridge address from the command decoder as depicted by block 330. As stated earlier, the preferred embodiment represents the cartridge address, as a level volume, LL, and a column position value, PP. Once the proper cartridge address is identified, the associated level or spider assembly is selected and engaged with the center column as depicted by block 332. Then in accordance with block 334, the selected level is rotated so that the identified column or cradle position PP is aligned within the elevator path at a position above the elevator plate. In the preferred embodiment, such a positioning of elements may be referred to as the elevator pickup position. Next, as depicted by block 336, the elevator is raised thereby passing through the rotated cradle and picking up the chosen cartridge and delivering this cartridge to the film deck.

Upon properly positioning the cartridge in association with the film deck, decision block 338 represents the determination made as to whether the status of the cartridge sensor is acceptable. Should the cartridge sensor status be acceptable, the microprocessor proceeds to determine if the status of the PIN detection sensor is satisfactory as depicted by decision block 340. However, should either the status of either the cartridge sensor or the PIN detection sensor be outside the predetermined tolerances, a error message is generated and sent to the operator as illustrated by block 342.

Once the cartridge and PIN detection sensors are verified acceptable, the microprocessor proceeds to obtain the particular frame address, FFFFF, of the requested image as depicted by block 344. To actually locate the desired frame, the film deck begins unwinding the film and counting the frames as they pass in accordance with block 346. As stated earlier, the counting of the individual frames may be accomplished by using a variety of the blip counting methods, including single and double blip configurations. As illustrated by the loop connecting block 348 and decision block 350, the frames are continually incremented until verification via decision block 350 indicates that the current frame number being counted is the same as the frame number associated with the requested image. After the proper frame number containing the requested image is identified, the image is centered within the film deck for later processing as represented by block 352. In the preferred embodiment of the present invention, this later processing is carried out via a Process Frame phase which is functionally described in the flowchart of FIG. 20 and will be discussed in greater detail later.

After the Put-Away phase has been used to clear the film deck of an undesired cartridge, and the Get Image phase has been employed to properly locate and center the frame containing the requested image, the operator may generate a SCAN command to allow him to view the data stored or the requested frame. In the preferred embodiment, as indicated by decision block 354 and associated block 356, the receipt of a SCAN command by the microprocessor, activates a Process Frame phase which, as stated earlier, is functionally depicted in the flowchart of FIG. 20.

Figure 20:
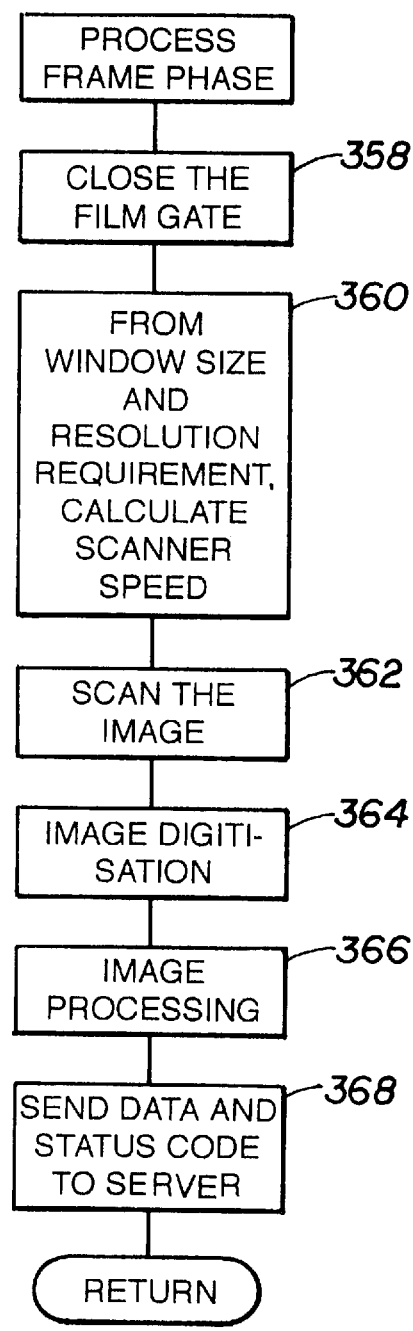
FIG. 20 depicts the steps involved in the process frame phase of the present invention.

Now referring to FIG. 20, to begin the processing associated with the Process Frame phase of the present invention, the microprocessor generates a signal which activates the closing of the film gate as depicted by block 358. The closing of the film gate secures the film in the proper position for subsequent image processing. Next, the microprocessor utilizes the particular window size and resolution requirements of the system as selected by the operator to relocate the most appropriate scanner speed, in accordance with block 360. Based upon the calculated scanner speed, the image is then scanned, as depicted by block 362. Following scanning of the image, the image is digitized as represented by block 364 and manipulated via well-known image processing methods as represented by block 366. In conclusion, the digitized data corresponding to the requested image, as well as a status code are delivered to the operator, as represented by block 368, thereby completing the Process Frame phase of the present invention.

Now referring to FIG. 16B, a determination represented by decision block 370 is made to verify that the operation requested was indeed completed in a successful manner. If it is determined that the operation was a success, then the storage and retrieval system is once again initialized, in accordance with block 276 and prepared to receive, evaluate and carry out the next command generated by the operator. However, if for some reason the requested operation was not appropriately completed, then the microprocessor makes another determination, in accordance with decision block 372 to determine if the particular error detected is of such a nature that it may be classified as a recoverable error. If the detected is classified recoverable, then the present invention initiates an internal error recovery logic as represented by block 374. The error recovery logic allows the system to detect certain minor errors, possibly make minor adjustments so that when the command is retransmitted, the operation may be successfully completed. However, as indicated by block 376, should the detected error be determined to be non-recoverable, then the entire storage and retrieval unit is shutdown.

Motion control is done using microprocessor based hardware and software techniques. All the essential variables of motion control: acceleration, optimum maximum concise speed, deceleration, torques tolerances allowed, etc. are digitally selectable. All the motion control systems are reduced to the mathematical transfer functions which can be manipulated depending on requirements. Depending on the short or long distance to be moved, velocity profile is generated by the system. This profile tries to move the object at the fastest possible smooth speed. Smooth speed refers to proper acceleration and deceleration profile which includes step size and time. While in motion, the system samples actual positions and compares against the expected position. Depending on results of the comparison, appropriate changes are made in the profile. When an object reaches its destination, it is positioned with pre-defined accuracy. Positions of all the objects ever moved by the system are sampled at regular intervals and appropriate actions are taken. This process always goes on when the system is in operation.

'Self-Learn' Feature

'Self-learn' feature is an effective and important capability of the system microfilm jukebox in a storage and retrieval system. So when a request for any image is received, it is one of the millions of images stored in the jukebox. Any request consists of the three following address information:

Level address of the cartridge storing the request image;
Position address of the cartridge storing the requested image;
Frame address of the requested image.

The preferred embodiment of the present invention has twenty-eight (28) levels, and every level can store up to fifteen (15) cartridges. For each requested image retrieval, level address is decoded first and appropriate level is selected. Then the position address is decoded using an encoded rotational address, and that particular level is rotated to position the cartridge in the elevator path. The elevator has to pick up this cartridge and move it up to the reader for scanning the image. The 'self learn' feature deals with rotational motion of the column and linear motion of the elevator.

The system learns by itself about rotational positions of all the cartridges stored as well as about park positions of the elevator (for all twenty-eight levels) for gentle pick up and drop off of the cartridge. It is very difficult to find out these addresses mathematically because of the mechanical variations and tolerances. In a manufacturing environment, it is a nightmare when these numbers vary from unit to unit. For reliable storage and retrieval operation, it is essential to have accurate information. Because of all these reasons, a self-learn technique was developed. The system learns to live with all the variations by self-teaching about all the necessary information. This technique also makes manufacturing of such a complex electro-mechanical system easy. It lets all the variables vary (within tolerance limit) from unit to unit and the system learns to live with it. In spite of all the variations, it ensures reliable storage and retrieval operation.

State of the art sensor technology is used. Reflected- and through-beam type are the two types of the sensors used. Sensors-flag system is used to detect the position and/or presence of the object to be detected. Sensors are throughout the system to keep track of the status of all the subsystems at all times. Sensor technology is also used to check health of the system from time to time. For error detection and error recovery, sensor technology is the heart of the technique. Sensors are ultra-high precision sensors.

Very sophisticated image processing techniques are developed to enhance image quality. Analog information on film is digitized to 256 grey levels. Convolution theory is used to bring information out from the noisy data. The grey level of each pixel is read and compared with the expected value. The expected value is calculated based on the grey level information of the neighboring pixels. Trends are taken into account for calculating expected values. When actual value and expected value is compared and the difference is greater than the tolerance allowed, then proper adjustments are made. Advanced filtering techniques are used. As a result of image processing, grey level data is converted to binary data. An alternate on-board enhancement option is also available using look up tables. Grey level output, if required for external image processing, is also available.

Image manipulation techniques are developed for addressing wider market need. Hardware and software is developed to scan the entire image or part of the image. Multiple scan windows per image can also be defined. Top and bottom of the image or only a middle section of the image can be scanned. Depending on the requirements, a window or multiple windows can be scanned at different resolutions. Depending on the scan window and resolution required, scan speed is calculated on-the-fly. Resolution is a very important factor of the image quality.

Information processing is another novel feature of this system. Information processing is the state-of-the-art concept in data processing and reduces drastically the amount of data to be handled as well as improving access time.

The present invention, with help of sensors and intelligent software, can recognize many of the errors and take proper corrective action without any intervention. It has, built in, three different levels of error recovery. The first level of recovery only affects the subsystem having an error condition. The second level of error recovery affects other subsystems also. The third and final level deals with fatal error conditions and stops the system operation. Operator intervention is required for third level of error recovery. The first two levels of error recovery is transparent to the user because the system recovers by itself by taking proper corrective actions.

A running error log of all the recoverable errors is kept. The log can be accessed using a utility program. The running log has a wrap-around capability which can be sorted for getting different kinds of information using the options of the utility program. Examples include a summary section of the log, types of errors occurred with error message, and error code and frequency of accuracy. The log provides vital information to the service engineer because it logs all the sequence of events leading to the error condition. If the system is functioning flawlessly, then at the time of 90 days preventive maintenance period, the log would give valuable information about recoverable errors. Proper action could be taken to take care of those errors. Without the log, those errors would have gone unnoticed because they are transparent to the user.

At power up, the system performs a very important self-diagnostic operation. It checks the health of different subsystems, sensors and basic key operations. Functioning of the hardware and sensors is checked thoroughly. If any malfunctioning is detected, the system tries to recover using error recovery logic. If the system recovers, then a log of all the events is recorded and then the system is put on-line. If the system cannot recover, then the proper error information is posted and system shuts itself down. Similar checks can also be performed using the system reset command. The objective of self-diagnostics is early detection of any malfunctions of hardware of any subsystem.

The system communicates with the outside world via a server and via a front panel LCD display. There is a two-line LCD display on the front panel. The first line displays the command the system has received. The second line displays status or error messages. Thus the server engineer knows exactly the status of the operation being performed. Error messages inform about the type of error condition that has occurred. Status or error information is also communicated to the server for every communication received. Some of these messages are displayed at the workstation for informing user about the status of the request made.

The following is a list of sensors used in the MegaSAR-420:

i. Elevator Home Sensor
ii. Knife In Sensor
iii. Knife Out Sensor
iv. Cartridge Detection Sensor
v. Take-up Reel Sensor
vi. Scanner Limit Sensors
vii. Pin-Home Sensors The sensors are used to detect the presence of the individual components in their home position at the start up of the system and monitor these components during the progression of events during a cycle.

DIAGNOSTICS

Since the MegaSAR-420 is controlled by an embedded 486 PC, the diagnostics are the same full-screen programs that are used during design and manufacturing.

The controller PC includes a hard disk and is run as a normal DOS operating machine, preferably using "Windows"™. One of the programs that can be run is the normal MegaSAR-420 controller program, which accepts formatted commands on a serial port and executes them.

The command program always displays its status on a 2-line, 24 character LCD display. The first line of the display shows the command the MegaSAR II is currently executing, or the most recent command it executed. The second line displays the internal state of the MegaSAR-420 in real time. The state is one of the following:

Done, waiting for command
Error number and message

Current action, e.g.:
    Rewinding film
    Elevator returns cart
    Column to home Other programs may be run on the controller PC. These programs are a suite of exerciser/diagnostic programs that are full-screen oriented and menu driven. It is possible to execute these programs by one of the following methods.

Connect a normal keyboard and monitor to the controller PC

Load a program like CloseUp into the controller PC, direct connect to the controller PC via one of the serial ports with a diagnostic PC and operate the controller as though with a directly connected monitor and keyboard.

Do the same as the previous step, except put a pair of modems and a phone line between the controller PC and the diagnostic PC. This enables all the diagnostics to be executed remotely.

The controller PC displays its detailed internal status to a monitor in additional to the two-line control panel display. If CloseUp is run during normal MegaSAR-420 operation, remote, real-time display of the MegaSAR-420's activity can be achieved.

While this invention has been described in detail with particular reference to the preferred embodiment thereof, it will be understood that variations and modifications can be effected with the spirit and scope of the invention as previously described and as defined in the claims.

What is claimed is:

1. A microfilm storage and retrieval system comprising:
    a) cartridge handling means for storing and retrieving microfilm cartridges comprising:
        i) a rotatable center column assembly including a vertical column;
        ii) at least twenty-eight vertically stacked spoked hubs, each having a center ring disposed around the vertical column and from which a plurality of spokes extend, wherein the spokes form:
            A) plurality of essentially equally-spaced gaps within each of which one of the microfilm cartridges may be stored, and
            B) an additional gap larger than the equally-spaced gaps used to establish a rotational home position for the spoked hubs and to establish a vertical column through which a selected one of the microfilm cartridges may pass through;
        iii) and rotation means for rotating a selected one of the vertically stacked spoked hubs so that a selected one of the equally-spaced gaps may be aligned within the vertical column so that the selected one of the microfilm cartridges may pass vertically through;
    b) a microfilm handling subsystem comprising:
        i) elevator means for transporting the selected one of the microfilm cartridges from the selected one of the equally-spaced gaps through the vertical column and to a display position including
            A) an elevator, and
            B) electrical lifting means for raising and lowering the elevator through the vertical column;
        ii) verification means for verifying that the spoked hub having the selected one of the equally-spaced gaps is the only one of the plurality of vertically-stacked spoked hubs rotated from its home position and for verifying that the elevator is below the selected one of the equally-spaced gaps; and
    c) a video image processing subsystem comprising:
        i) a projection means for projecting an image from a selected frame of microfilm onto a projection plane;
        ii) a scanning array means comprising a linear array of sensors for converting light intensities on the projection plane into proportional electrical voltages,
        iii) array moving means for moving the scanning array means through the projection plane, and
        iv) an image enhancement processor means to determine for each of the proportional electrical voltages whether a pixel represented thereby is a foreground or a background pixel;
wherein each subsystem is accessible and controllable as part of a local area computer network.

* * * * *